United States Patent
Jimeno Chueca et al.

(10) Patent No.: US 10,294,626 B2
(45) Date of Patent: May 21, 2019

(54) METHOD OF INSTALLATION OF AN OFFSHORE WIND TURBINE TOWER, WITH PILE-BASED FOUNDATIONS, AND EQUIPMENT FOR IMPLEMENTING SAID METHOD

(71) Applicants: José Emilio Jimeno Chueca, Madrid (ES); José Luis Lleyda Dionis, Madrid (ES)

(72) Inventors: José Emilio Jimeno Chueca, Madrid (ES); José Luis Lleyda Dionis, Madrid (ES); Miguel Ángel Fernandez Gómez, Madrid (ES)

(73) Assignee: DREIVENTUM, S.L.U., Madrid (ES)

( * ) Notice: Subject to any disclaimer, the term of this patent is extended or adjusted under 35 U.S.C. 154(b) by 637 days.

(21) Appl. No.: 14/764,458

(22) PCT Filed: Jan. 24, 2014

(86) PCT No.: PCT/ES2014/070049
§ 371 (c)(1),
(2) Date: Jul. 29, 2015

(87) PCT Pub. No.: WO2014/118411
PCT Pub. Date: Aug. 7, 2014

(65) Prior Publication Data
US 2015/0361965 A1   Dec. 17, 2015

(30) Foreign Application Priority Data

Jan. 29, 2013   (ES) .................................. 201330104

(51) Int. Cl.
*E02D 27/42*   (2006.01)
*E02D 27/16*   (2006.01)
(Continued)

(52) U.S. Cl.
CPC ........... *E02D 27/16* (2013.01); *E02D 27/425* (2013.01); *E02D 27/50* (2013.01); *E02D 27/525* (2013.01);
(Continued)

(58) Field of Classification Search
CPC ....... E02D 27/16; E02D 27/42; E02D 27/425; F03D 13/10; F03D 13/20; F03D 13/22; F03D 13/25
(Continued)

(56) References Cited

U.S. PATENT DOCUMENTS 6,652,192 B1 * 11/2003 Xu ...................... B63B 35/4413
                                                             114/264
2006/0104821 A1   5/2006 Hall
2013/0019792 A1   1/2013 Jahnig et al.

FOREIGN PATENT DOCUMENTS

EP   2495370 A1   9/2012
WO   03080939 A1   10/2003

OTHER PUBLICATIONS

International Search Report for Application No. PCT/ES2014/070049 dated Apr. 11, 2014.

* cited by examiner

*Primary Examiner* — Sunil Singh
(74) *Attorney, Agent, or Firm* — Dickinson Wright PLLC

(57) ABSTRACT

Method for installation of an offshore tower, which comprises: providing a tower mast, piles, anchoring means, a platform with securing means, and buoyancy means with securing means; fastening piles to platform; fastening mast to platform in the use position; providing actuation and/or braking means between piles and platform; providing a platform between lower zone and upper zone; anchoring means to piles and to platform; launching buoyancy means; launching base assembly (platform, mast, piles, anchoring
(Continued)

means); securing base assembly to buoyancy means using securing means; transferring transport assembly to tower location; actuating actuation and/or braking means until piles are fixed in the seabed; fastening piles to seabed; actuating actuation and/or braking means until platform is on a level with pile upper zone; mounting wind turbine on mast; removing securing means and withdrawing buoyancy means from platform; and tensioning anchoring means.

37 Claims, 21 Drawing Sheets

(51) Int. Cl.
| | | |
|---|---|---|
| *E02D 27/50* | (2006.01) | |
| *E02D 27/52* | (2006.01) | |
| *F03D 13/20* | (2016.01) | |
| *F03D 13/10* | (2016.01) | |
| *F03D 13/40* | (2016.01) | |
| *F03D 13/25* | (2016.01) | |

(52) U.S. Cl.
CPC .............. *F03D 13/10* (2016.05); *F03D 13/22* (2016.05); *F03D 13/40* (2016.05); *F03D 13/25* (2016.05); *F05B 2230/60* (2013.01); *F05B 2230/61* (2013.01); *F05B 2240/95* (2013.01); *Y02E 10/727* (2013.01); *Y02P 70/523* (2015.11)

(58) Field of Classification Search
USPC ........ 405/196–197, 199–200, 203, 205–209, 405/223.1, 224, 227–228
See application file for complete search history.

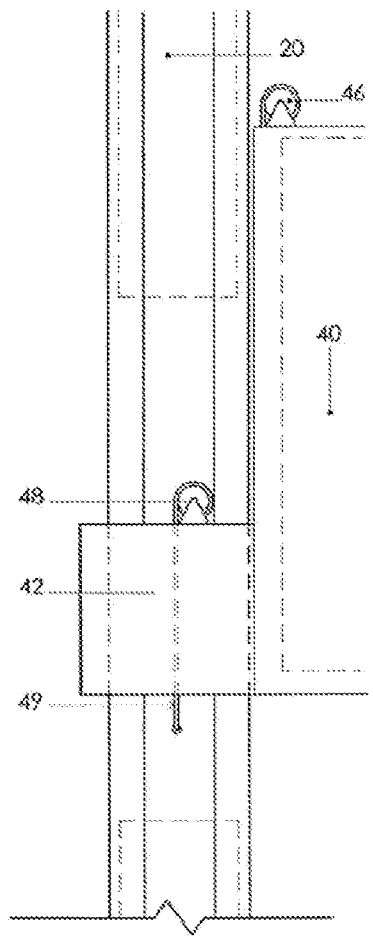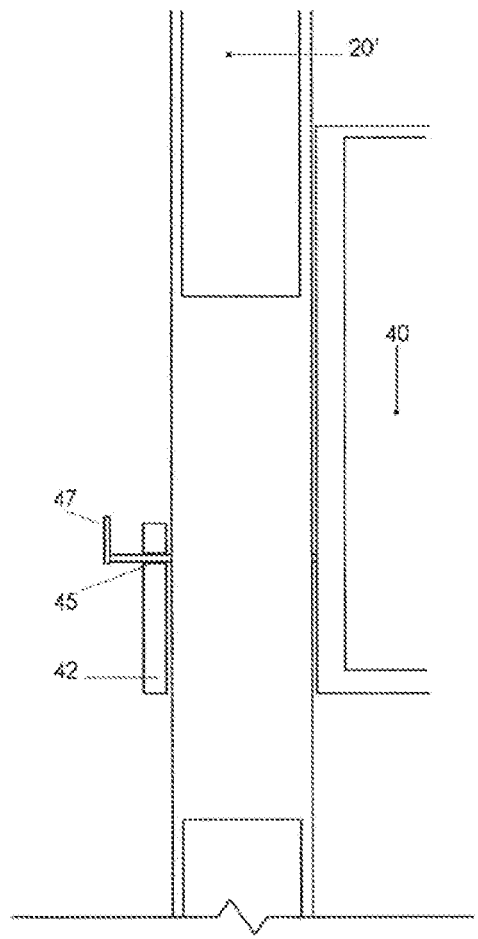
FIG. 1D1    FIG. 1D2

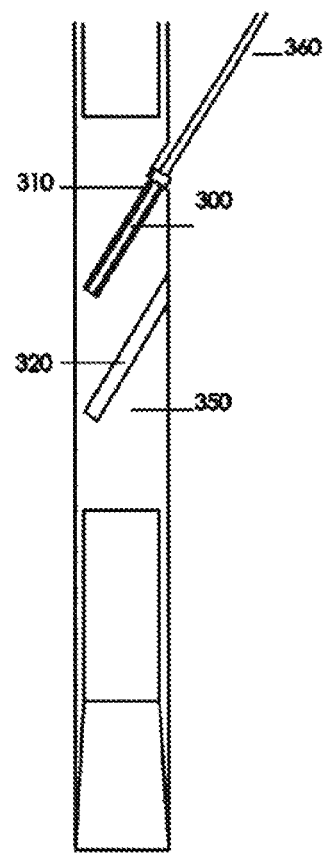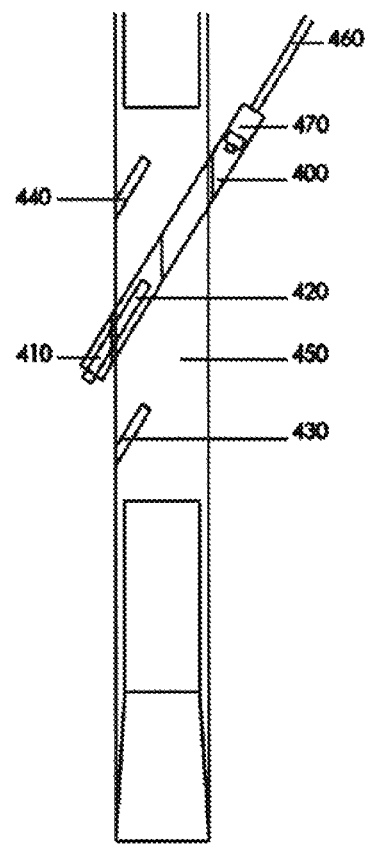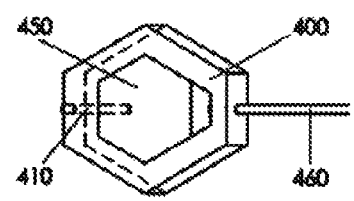
FIG. 16A        FIG. 16B

METHOD OF INSTALLATION OF AN OFFSHORE WIND TURBINE TOWER, WITH PILE-BASED FOUNDATIONS, AND EQUIPMENT FOR IMPLEMENTING SAID METHOD

FIELD OF THE INVENTION

The present invention relates to a method of installation of an offshore wind turbine tower, with pile-based foundations, and to equipment for implementing said method.

The present invention is, therefore, included mainly in the sector of power generation installations, specifically renewable energy from wind power.

BACKGROUND OF THE INVENTION

Without limiting character, solutions generally contemplated in the current state of the art for offshore foundations are listed and succinctly described below.
  Gravity foundations: footings with concrete structure, often with pedestals. They are transported and anchored with barges and/or marine cranes. For low depths.
  Pile-based foundations:
  Metal driven-in monopile, gap-free with the tubular metal mast of the tower. For low depths.
  Tripile: the metal tower rests, using a transition piece generally in the form of three-arm blade, on three vertical piles submerged and driven into the seabed. For medium and high depths.
  Tripod: the metal tower is supported on a structure of three inclined piles, which rest on the ground using driven-in piles or another similar system. The tower may be centred with respect to the tripod piles or located on one of them. For medium and high depths.
  Lattice: the metal tower rests using a lattice structure of four piles. For medium and high depths.
  Suction bucket: based on the driving-in of watertight buckets in the marine subsoil and the consequent use of the different pressure differences generated. For low depths.
  Buoyancy solutions secured to the seabed. For very high depths.

In relation to the gravity foundations, they are largely formed in situ using, among other means, mixer boats and/or crane boats, so that the environmental conditions cannot be very aggressive. Furthermore, the ground must be firm so that normally the upper layer of the seabed is removed for better settling; in this case, submariners cover the ground in gravel. The main disadvantage of installing this type of systems is their high cost, which a study indicates is directly proportional to the square of the depth at which the wind farm is placed. This means they are only applied at low depths.

In relation to pile-based foundations and suction buckets, they usually use support assemblies formed ashore. For these alternatives, it is not necessary to condition the seabed, which allows saving considerable money. Even so, the cost is high since it requires an important deployment of means of transport (barges, floating cranes or hoisting vessels, floating cranes or pile driver vessels, etc.) both for the transport of components involved and for the in situ assembly, without prejudice to the fact that both the transport and assembly and the manufacturing are relatively simple. Furthermore, if only the means of transport and assembly necessary to install the towers one by one are used to keep the costs to a minimum, the tower installation depends on the means for it remaining free after installation of the previous tower, which often determines an installation rate slower than that desired.

Buoyancy foundations have been considered but are not at a point which allows their mass industrialization.

SUMMARY OF THE INVENTION

In the present document, the expression "ashore" indicates on a working surface that is not submerged, for example, a quay, a dry dock or similar. Also in the present document, in order to simplify, reference will be made to an offshore tower designed to be mounted in the sea, therefore using expressions such as "seabed" or "sea", without for this reason the scope of the invention being limited to such use, and the invention can also be applied to offshore towers designed to be mounted in any water mass, for example an ocean, a lake, etc. Furthermore, the expression "wind turbine means" relates to a part or all of the components of a wind turbine tower directly designed for the capture of wind power and/or the transformation of wind power into electricity, such as, for example, the engine or its parts, the rotor or its parts, the blades or their parts, etc.

An object of the present invention is, therefore, providing a method of installation of an offshore wind turbine tower, with pile-based foundations, which is simple and economical and still allows a high installation rate.

More specifically, the invention relates to a method of installation of an offshore wind turbine tower, with pile-based foundations, the equipment for implementing said method comprising: a tower mast, at least three piles, anchoring means (preferably flexible, for example in the form of steel tendons), a platform designed to support said mast and to rest in turn on said piles, and buoyancy means, said piles being applied to said platform so that said piles are essentially vertical and each one of said piles can be axially displaced, i.e. in a direction parallel to the longitudinal axis of the pile, with respect to said platform. Each one of said piles includes an upper area designed to be on a level with said platform in the installed condition of the tower, preferably above the maximum surge level applicable in the installed condition of the tower, and a lower area designed to receive at least two of said anchoring means and situated below said upper area and above the planned level of the seabed in the installed condition of the tower. The upper area of each pile may be situated substantially in correspondence with the upper end of the corresponding pile or, alternatively, may be situated at such a height of the corresponding pile that a certain length of the corresponding pile remains above the level of said platform in the installed condition.

The method in accordance with the present invention comprises the following stages in any technically possible order:
  a) providing a tower mast, at least three piles, anchoring means (preferably flexible, for example in the form of steel or carbon fibre tendons), a platform with first securing means, and buoyancy means with second securing means, wherein the interaction between said first and second securing means produce the mutual securing thereof;
  b) ashore, applying said piles to said platform so that said piles are essentially vertical and each one of said piles can be axially displaced, i.e. in a direction parallel to the longitudinal axis of the pile, with respect to said platform;

c) ashore, applying said mast to said platform in the relative position of use in the installed condition of the tower;

d) ashore, disposing actuation and/or braking means operationally between each one of said piles and said platform, so that the actuation of said actuation and/or braking means control the axial displacement of each pile with respect to said platform;

e) ashore, disposing said platform and said piles in a relative position such that said platform is placed in an intermediate position between the lower area and the upper area of each one of said piles, possibly using the actuation of said actuation and/or braking means;

f) ashore, anchoring one end of each one of said anchoring means to the lower area of each one of said piles; respectively, and anchoring the other end of each one of said anchoring means to said platform, preferably so that each one of said anchoring means does not substantially support any tensile stress and, in the installed condition of the tower, each one of said anchoring means forms an angle with the vertical;

g) launching said buoyancy means;

h) launching the base assembly comprising said platform, said mast, said piles and said anchoring means;

i) securing said base assembly to said buoyancy means using the application to one another of said first and second securing means, providing said buoyancy means with sufficient floatability to keep afloat the transport assembly comprising said base assembly and said buoyancy means;

j) transferring said transport assembly until the location planned for the wind turbine tower;

k) actuating said actuation and/or braking means so that said piles displace downwards with respect to said platform, until the lower end of each one of said piles is applied to the seabed;

l) fastening the lower end of each one of said piles to the seabed;

m) actuating said actuation and/or braking means until said platform is on a level with said upper area of each one of said piles;

n) mounting wind turbine means on said mast;

o) detaching said first and second securing means from one another and removing said buoyancy means from said platform, and optionally displacing the platform to a level above the action of the surge; and p) tensioning said anchoring means.

It is important to highlight that, to perform stage o), the assembly formed by said buoyancy means and said platform shall be preferably at a depth equal to the buoyancy draft of said buoyancy means alone. In this way, the detachment of said first and second securing means from one another and the removal of said buoyancy means from said platform can be carried out without the load imposed by the fact that said buoys support said platform in on the surface. Therefore, in the implementation of the method of installation in accordance with the present invention, the platform can be displaced until a position wherein, effectively, the assembly formed by said platform is at a depth equal to the buoyancy draft of said buoyancy, means alone, to then carry out stage o). It is possible that displacement of the platform is a downward displacement, for example if the method of the invention consists of the steps listed above and the steps are executed in the same order wherein they are previously listed. In the case of a downward displacement, the platform may be displaced using actuation means.

Preferably, said offshore wind turbine tower comprises three piles, and said platform also includes three through-holes in each one of which they are disposed and may axially slide each one of said three piles. In general, it is preferred that said through holes are preferably disposed in locations equidistant to one another and in relation to the centre of said platform, and that the tower mast is disposed in the centre of said platform.

Stage b) and stage e) can be carried out simultaneously, applying the piles to the platform now in a relative position such that said platform is displaced in an intermediate position between the lower area and the upper area of each one of said piles. This may be achieved, for example, if the platform rests on a provisional pedestal or is suspended at a certain height at the time of applying the piles to the platform.

Before stage j), the wind turbine means can be disposed on said buoyancy means. Furthermore, said buoyancy means may include lifting devices, for example, tower cranes, capable of lifting until its use position the wind turbine means from its position on said buoyancy means. In this way, stage n) is performed with means of the transport assembly, even further reducing the need for external installation means. Alternatively, stage n) can be carried out before stage j), preferably in the factory, preferably using the means used to perform stages b)-c), so that the need for disposing additional installation means, such as external installation means or even said lifting devices is reduced, or even eliminated if stage n) involves the wind turbine means in its assembly, in additional to simplifying the works to perform in the definitive location of the tower. In this case, however, the buoyancy means must be of greater size since it raises the centre of gravity of the transport assembly.

The piles may be piles designed to be driven into the seabed to produce the foundations, in which case the securing of stage l) consists of carrying out the actions necessary to complete the driving of said piles. Said stage l) may therefore comprise in turn two sub-stages:

11) pre-driving the piles into the seabed, simply due to their own weight;

12) driving the piles into the seabed, by the application of additional weight or by the use of a pile driver.

Stage l), or sub-stages 11) and/or 12), can be carried out using external pile driver means, as is known in the state of the art. Alternatively or complementarily (if the composition and hardness of the seabed and other installation parameters so allow), stage l), or stages 11) and/or 12), can be carried out by actuating said actuation means of each one of said piles so that said platform is displaced upward with respect to said piles and the weight of said platform, and also consequently the weight of said mast which rests on said platform, and optionally the weight of said buoyancy means and the weight of the wind turbine means, cause the driving-in of the piles, which would further reduce the need for external installation means.

Alternatively, the piles may be piles designed to have a lower end (integral or accessory) in the form of footing, in which case stage l) therefore consists of carrying out the actions necessary to complete the embedding of said footing in the seabed to the planned measurement. Said footing may comprise a substantially horizontal body of footing and at least one protuberance which emerges from the lower face of said body of footing and which has a tapered profile in downward direction. Such protuberance is designed to exercise opposition to horizontal displacements of the footing embedded in the seabed. Said stage l) can be carried out by actuating said actuation and/or braking means of each one of said piles so that said piles are displaced downwards with respect to said platform and the weight of said platform, and also consequently the weight of said mast which rests on said platform, and optionally the weight of said buoyancy means and the weight of the wind turbine means, cause the planned embedding.

The fact that said piles are applied to said platform so that each one of said piles can be axially displaced with respect to said platform provides an adjustable tower, which can be easily adapted to irregular seabeds, as regards both profile and composition.

Said buoyancy means may be formed by a single buoyancy unit. Alternatively, said buoyancy means may comprise a plurality of buoyancy units, in which case several buoyancy units of said buoyancy means may include third securing means such that the interaction between said third securing means of different buoyancy units produce the mutual securing thereof.

Furthermore, said buoyancy means may be motorized, so that the transport assembly would be a self-propelled transport assembly, even further reducing the need for external installation means.

In this way, the present invention provides an installation solution of an offshore wind turbine tower, with pile-based foundations, which has desirable characteristics.

Of course, the mast provided in stage a) may be formed by stretches of mast, which in turn may be formed by segments. In such case, the application of said mast to said platform in the relative position of use in the installed condition of the tower, according to stage c), can be carried out by parts, i.e. either using a segment-to-segment placement process until the installed condition of the tower or, preferably, using a stretch-to-stretch placement process until the installed condition of the tower once said stretches have been premounted, or using a placement process which is a combination of the two aforementioned processes. Said mast may, also be telescopic self-expanding, which may facilitate stage j) since the transfer could be carried out with the mast in retracted condition, possibly even with the wind turbine means already mounted on the mast in retracted condition.

The installation solution in accordance with the present invention is simple, since the base assembly of the tower (piles, anchoring means, platform and mast, and optionally wind turbine means) is formed in the factory, preferably ashore, and in that condition it is transported until the installation point, wherein it is simply self-installed until the tower is established, only occasionally with the aid of external installation means for the wind turbine means if they are not included in the base assembly.

The installation solution in accordance with the present invention may also be economically advantageous, because the buoyancy means may be reusable (i.e. they may be manufactured with a configuration such that it allows that, once removed from a platform according to a method in accordance with the present invention, they can be used in a new method in accordance with the present invention and so on and so forth until exhausting the useful life of the buoyancy means), and because the use of other external installation means (including material and human resources for underwater work) can be avoided or at least minimized.

Furthermore, it allows a high installation rate since the production of the components may be continuous and the method of the invention may avoid dependency upon the availability of installation means outside the actual wind turbine tower, with the exception of the buoyancy means which, however, may be provided by the factory or the wind turbine tower or towers to be installed.

In the method in accordance with the present invention, the disposal of the anchoring means and the use of buoyancy means independent from the rest of the equipment for implementing said method, which are removed from the tower during the method of installation of the tower, make it possible to use a platform with a very limited size, which also means limiting the unit cost of this type of tower with platform and piles.

On the other hand, the fact that said piles are applied to said platform so that each one of said piles can be axially displaced with respect to said platform and the fact that the buoyancy means may again secure said platform allows the tower in the installed condition to be easily displaced until a landfill or an alternative site, after the cutting the piles at the level of the seabed, if necessary.

BRIEF DESCRIPTION OF THE DRAWINGS

These and other characteristics of the present invention shall be revealed from the following description of an embodiment thereof, only given by way of non-limiting example, with reference to the attached drawings, wherein:

FIG. 16A is an elevational view which shows an alternative for the anchoring of anchoring means on a pile, and FIG. 16B is an elevational view which shows another alternative for the anchoring of anchoring means on a pile (upper part of the figure) and its top plan projection (lower part of the figure).

DESCRIPTION OF AN EMBODIMENT OF THE INVENTION

Figure 1A:
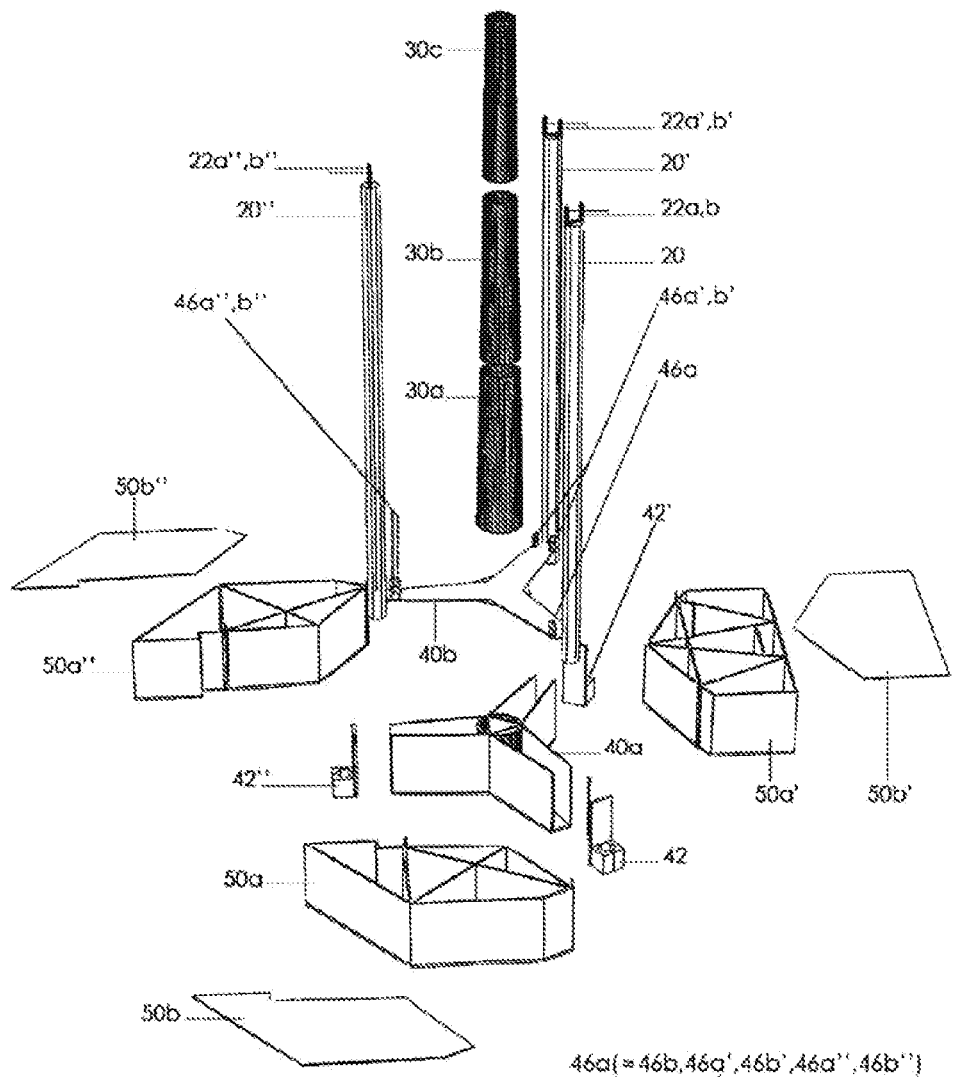
FIG. 1A is a perspective exploded view of equipment used in a first embodiment of a method of installation in accordance with the present invention.
Figure 1E:
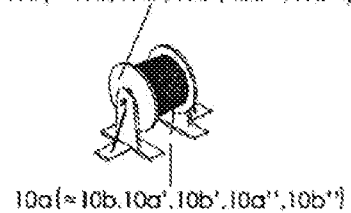
FIG. 1E is an enlarged detail of a part of FIG. 1A.

With reference to FIGS. 2-11, they show different stages of a first embodiment of a method of installation of an offshore wind turbine tower, with pile-based foundations, in accordance with the present invention, in chronological order. FIGS. 1A and 1E together show equipment used in said method of installation illustrated in FIGS. 2-11, and FIGS. 1B and 1C show respective details of the piles of FIG. 1A.

FIG. 1E shows a bobbin 46a («46b, 46'a, 46'b, 46"a, 46"b) (simply identified with reference 46 throughout the present description when it alludes to an assembly of all them) wherefrom a steel tendon 10a («10b, 10'a, 10'b, 10"a, 10"b) will be extracted (simply identified with reference 10 throughout the present description when it alludes to an assembly of all them). Said tendons 10 are designed to function as anchoring means. FIG. 1A shows three hexagonal piles 20, 20', 20"; three stretches 30a, 30b, 30c of mast which will jointly form the mast 30 of a wind turbine tower once fastened together coaxially; a tower section 40a with star plan with three arms and an upper closure slab 40b which in mounted condition will form a platform 40 designed to rest on said piles 20, 20', 20" and supporting said mast 30, said platform 40 having a cover at each one of the ends of its three arms, which includes an integral bracket 42, 42', 42" which has a vertical through-hole to receive in sliding manner a corresponding pile 20, 20', 20" and two through-holes (of which only one 44a is referenced, only in FIG. 4 for reasons of clarity) designed to receive in sliding manner and guide separate anchoring means 10; and three tower sections 50a, 50a', 50a" of polygonal plan and corresponding upper closure slabs 50b, 50b', 50b" which in mounted condition will form three buoys 50, 50', 50".

In this embodiment, said piles 20, 20', 20", said mast 30, said platform 40 and said buoys 50, 50', 50" are made of concrete, using prefabricated concrete sheets and joined together by a manner known in the state of the art, but all or part of them may be made from another material, for example, metal, composite, etc., or from a combination of materials, for example concrete-metal, metal-composite, concrete-metal-composite, etc. Likewise, in this embodiment, said platform 40 has the form with star plan and houses three piles 20, 20', 20", but of course it may have any desired form, both in plan and in elevation, provided that it enables putting into practice the method in accordance with the present invention, and could be prepared to effectively house more than three piles. It can also be observed that said buoys 50, 50', 50" are compartmentalized using internal concrete walls.

Figure 1B:
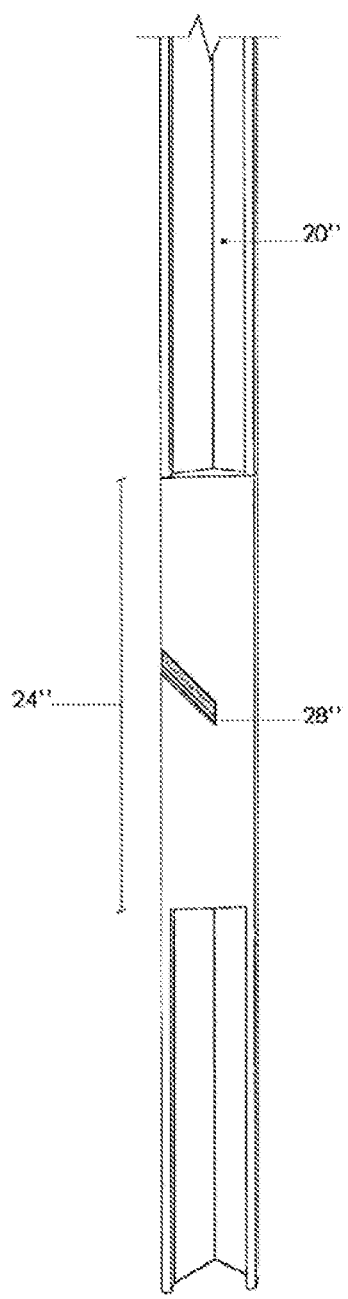
FIGS. 1B and 1C are respectively a perspective longitudinal sectional view according to detail B of FIG. 2 and a perspective view according to detail C of FIG. 3, FIGS. 1D1 and 1D2 are longitudinal sectional views which show two alternative configurations of a braking and control device which can be used in said first embodiment of a method of installation in accordance with the present invention.
Figure 1C:
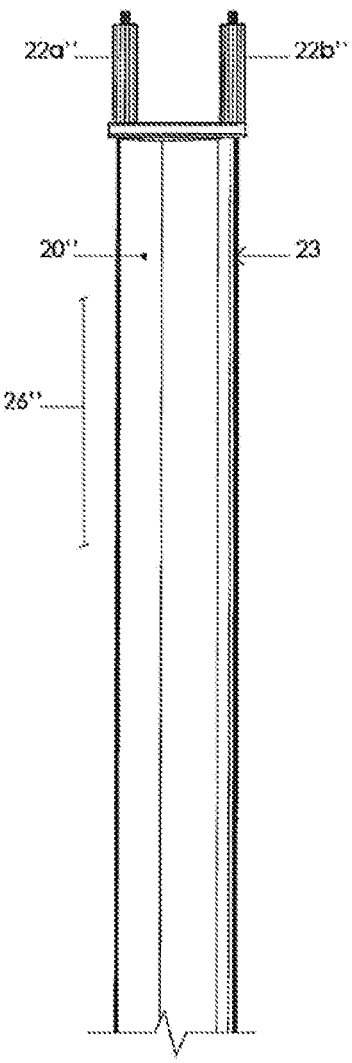

As shown in FIG. 1C, two winches 22a, 22b, 22a', 22b', 22a", 22b" (simply identified with reference 22 throughout the present description when it alludes to the assembly of all of them) are disposed at the upper end of each one of said piles 20, 20', 20", from each one of which hangs a steel rope (of which only one 23 is referenced, only in this FIG. 1C for reasons of clarity) which runs downward beside the corresponding pile 20, 20', 20". As shown in FIG. 1B, said piles 20, 20', 20" are largely hollow throughout their length. However, each one of said piles 20, 20', 20" has a lower area 24, 24', 24" designed to receive one end of two anchoring means and is situated above the planned level of the seabed once the pile has been driven-in in the installed condition of the tower, each one of said lower areas 24, 24', 24" being solid and being provided with a respective anchoring coupler 28, 28', 28" for the anchoring means. Such anchoring coupler may be of any type and is well known in the state of the art, so that it will not be explained in detail in the present document. Returning to FIG. 1C, each one of said piles 20, 20', 20" also has an upper area 26, 26', 26" designed to remain in this embodiment joined to the respective brackets 42, 42', 42", above the level of the surrounding surge in the installed condition of the tower. In this embodiment, each one of said upper areas 26, 26', 26" is situated in a position of the piles 20, 20', 20" such that, in the installed condition, a certain length of each pile 20, 20', 20" protrudes above each respective bracket 42, 42', 42".

Figure 2:
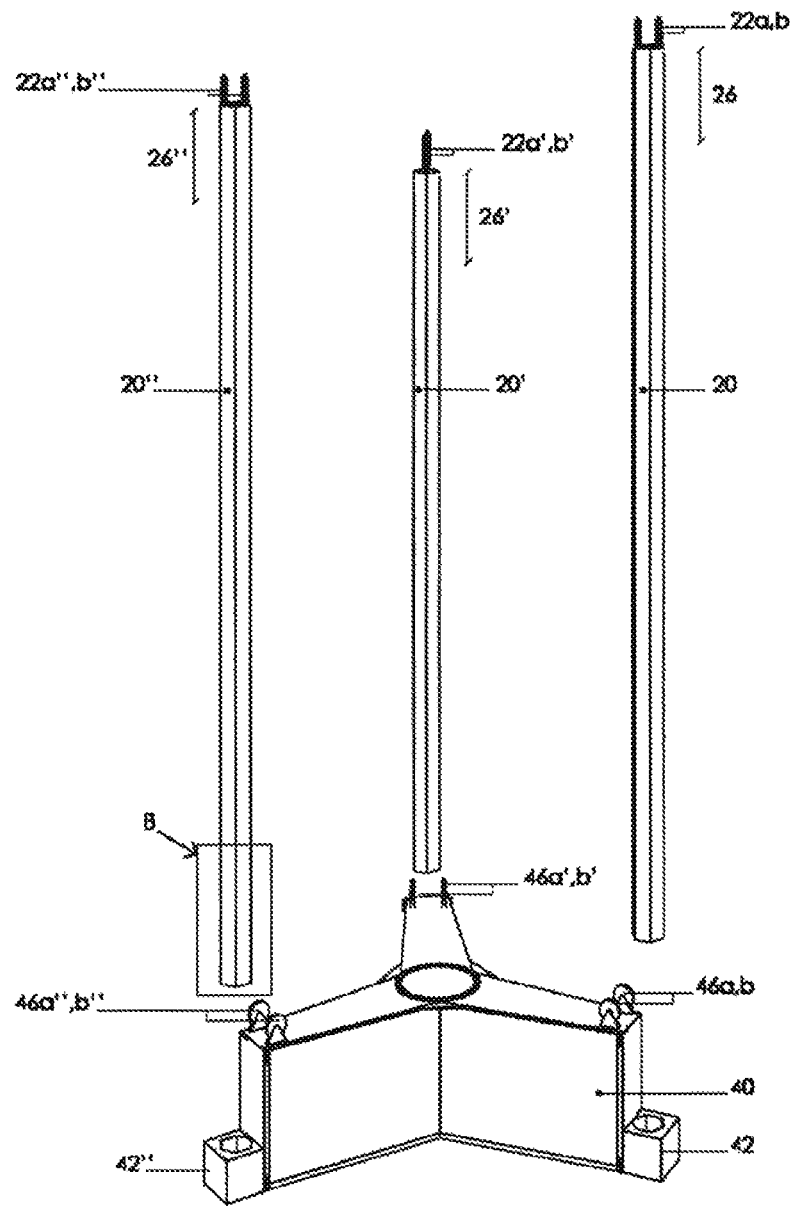
FIG. 2 is a perspective view of equipment to perform said first embodiment of a method of installation in accordance with the present invention, in a stage of application of the piles to the platform.

FIGS. 1D1 and 1D2 show different alternative configurations of one 42 of said brackets 42, 42', 42" of said platform 40. Specifically making reference to FIG. 1D1 said bracket 42 comprises a bobbin 48 joined in fixed manner to said bracket 42 and which has a cable 49 wound on it. One end of said cable 49 is joined to the bobbin 48 and the other end of said cable 49 is joined to the pile 20 at a level below the bracket 42. The bobbin 48 lifts or lowers cable in controlled manner, so that it can be used as a means of controlled lowering of the pile in relation to the bracket and consequently in relation to the platform. Making specific reference now to FIG. 1D2, said bracket 42 comprises a substantially horizontal through-hole 45 wherein is housed a pin 47 loaded in direction towards the pile which passes through said bracket 42. The pin 47 exercises more or less pressure on the pile 20 in controlled manner, so that it can be used as means of controlled lowering of the pile in relation to the bracket and, consequently, in relation to the platform.

FIG. 2 shows said platform 40 resting on the ground and said piles 20, 20', 20" vertically approaching said platform 40, in correspondence with said holes of said brackets 42, 42', 42", each one of said piles 20, 20', 20" being at a different distance from said platform 40. Said piles 20, 20', 20" are displaced by means of conventional lifting, for example a crane, not shown.

Figure 3:
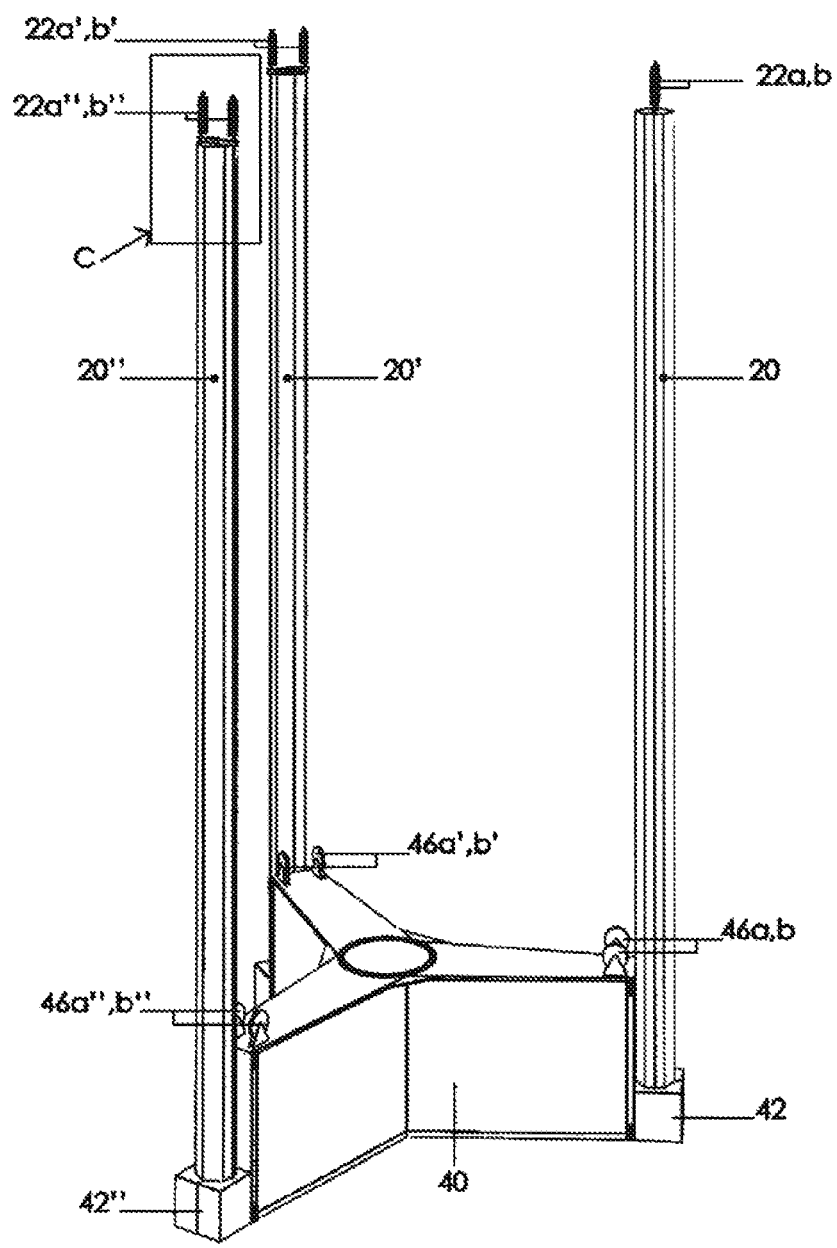
FIG. 3 is a perspective view of equipment to perform said first embodiment of a method of installation in accordance with the present invention, in a stage wherein the piles and their actuation means is applied on the platform.

Now going on to FIG. 3, said piles 20, 20', 20" are now applied to said platform 40, so that said piles 20, 20', 20" are essentially vertical and each one of said piles 20, 20', 20" can be axially displaced, i.e. in a direction parallel to the longitudinal shaft of the pile 20, 20', 20", with respect to said platform 40. More specifically, each one of said piles 20, 20', 20" is applied in each one of said vertical through-holes vertical of each one of said integral brackets 42, 42', 42" and they can be vertically slid in. In this point, given that said piles 20, 20', 20" now have said winches 22, said winches 22 are applied to said platform 40 using the connection of each free end of said steel ropes to said platform 40, specifically to said brackets 42, 42', 42", so that the actuation of said winches 22 makes the platform 40 rise or lower with respect to said piles 20, 20', 20".

Figure 4:
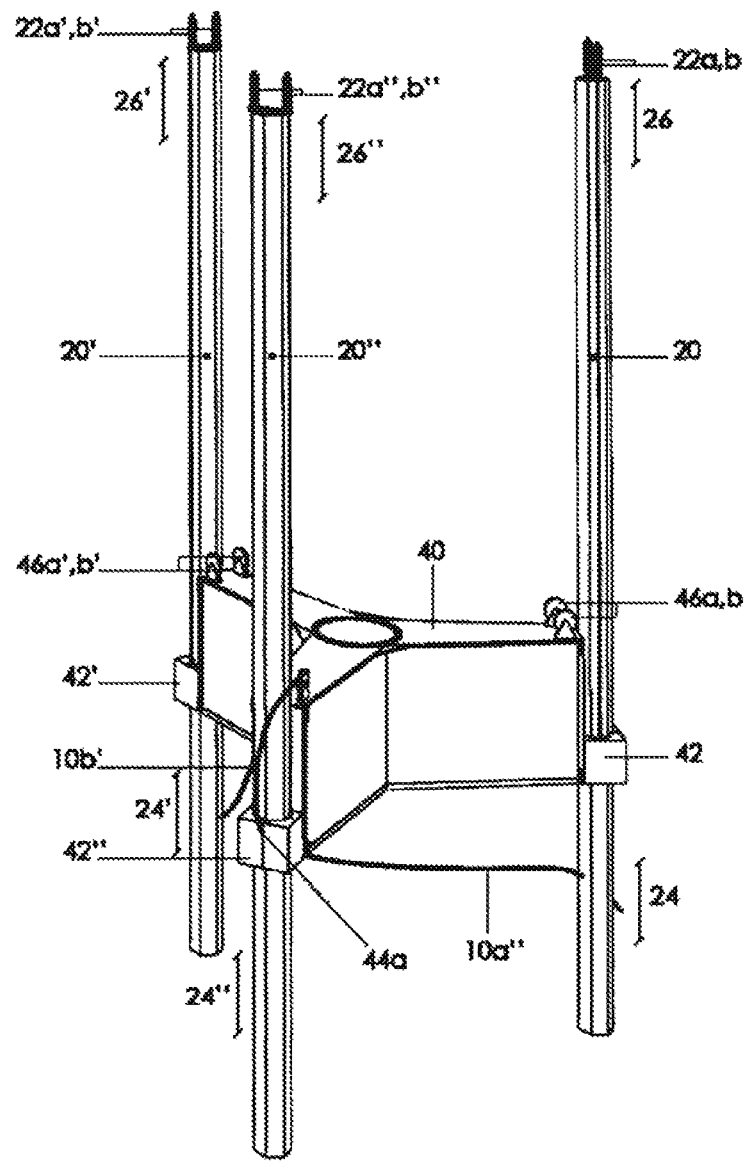
FIG. 4 is a perspective view of equipment to perform said first embodiment of a method of installation in accordance with the present invention, in a stage of placing of the platform and the piles in an intermediate relative position, showing the disposal of an anchoring means.

In FIG. 4, said platform 40 has passed to the intermediate position between the lower area 24, 24', 24" and the upper area 26, 26', 26" of each one of said piles 20, 20', 20", using an actuation of gather the rope of the winches 22. Likewise, two anchoring means 10a", 10b' of said anchoring means 10 have been anchored, by one end, to said lower area 24, 24' of said piles 20, 20', specifically inserting each anchoring means 10a", 10b' in a respective anchoring coupler 28, 28' of a lower area 24, 24', and, by the other end, to said platform 40. In particular, said anchoring means 10 emerge from said lower areas 24, 24', 24" and pass in upward direction through said through-holes 44, 44', 44" of said brackets 42, 42', 42" to end in said bobbins 46 situated on said upper closure slab 40b of said platform 40. Said bobbins 46 may be motorized and/or include braking or retention means, to be able to cooperate in controlling the useful length of said anchoring means 10 and of its tension.

In this embodiment, each one of said anchoring means 10 is loose in this initial condition. Furthermore, in this embodiment, the anchoring means 10 are anchored so that from each lower area of a pile emerge two anchoring means, each one of them towards a bobbin close to each one of the other two piles, so that, in the installed condition of the tower, when said anchoring means is tensioned, two anchoring means are found on each imaginary surface delimited by two piles forming a St Andrew cross (see FIG. 11B).

Figure 5A:
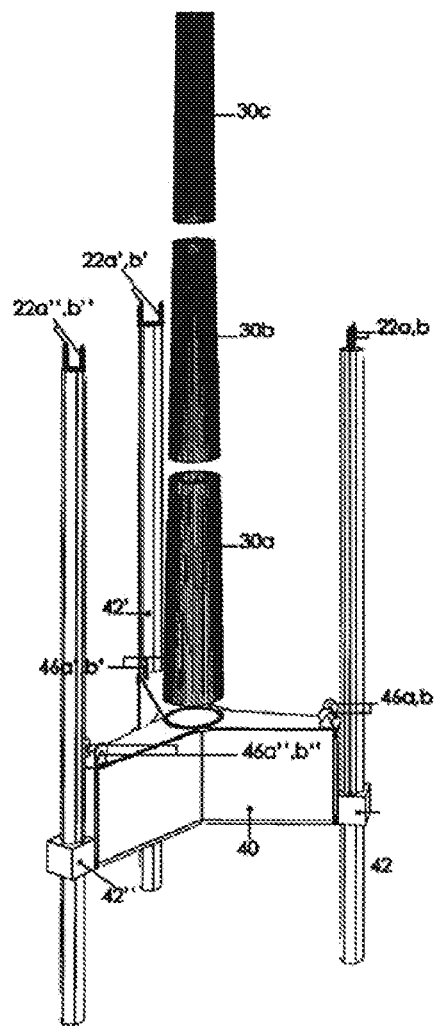
FIGS. 5A and 5B are perspective views of equipment to perform said first embodiment of a method of installation in accordance with the present invention, in a stage of application of the tower mast to the platform.
Figure 5B:
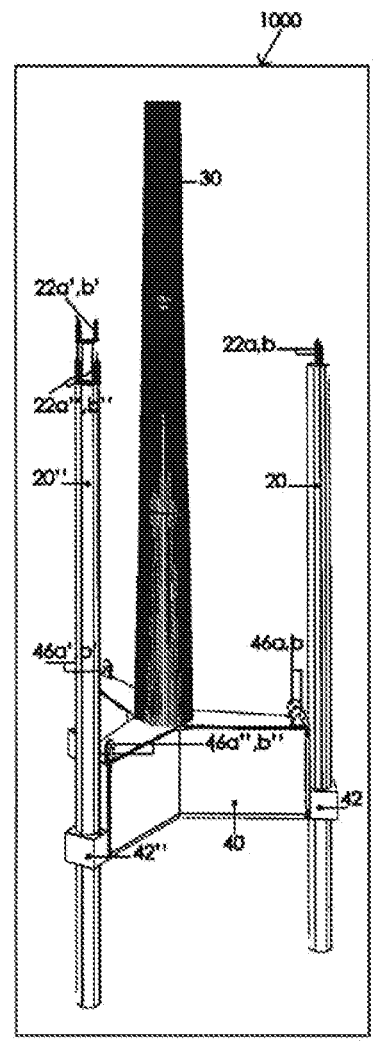

FIGS. 5A and 5B are views which represent the stage of application of the mast 30 of the wind turbine tower to the platform 40, and more specifically of the stretches 30a, 30b, 30c of mast which jointly form said mast 30 (at the point represented in these FIGS. 5A and 5B relative to this embodiment, said anchoring means 10 are now anchored to said piles 20, 20', 20" and said platform 40, but they are not illustrated for reasons of clarity). In this embodiment, the application of the mast 30 to the platform 40 is, therefore, carried out using a stretch-to-stretch placement process until the installed condition of the tower.

Figure 6:
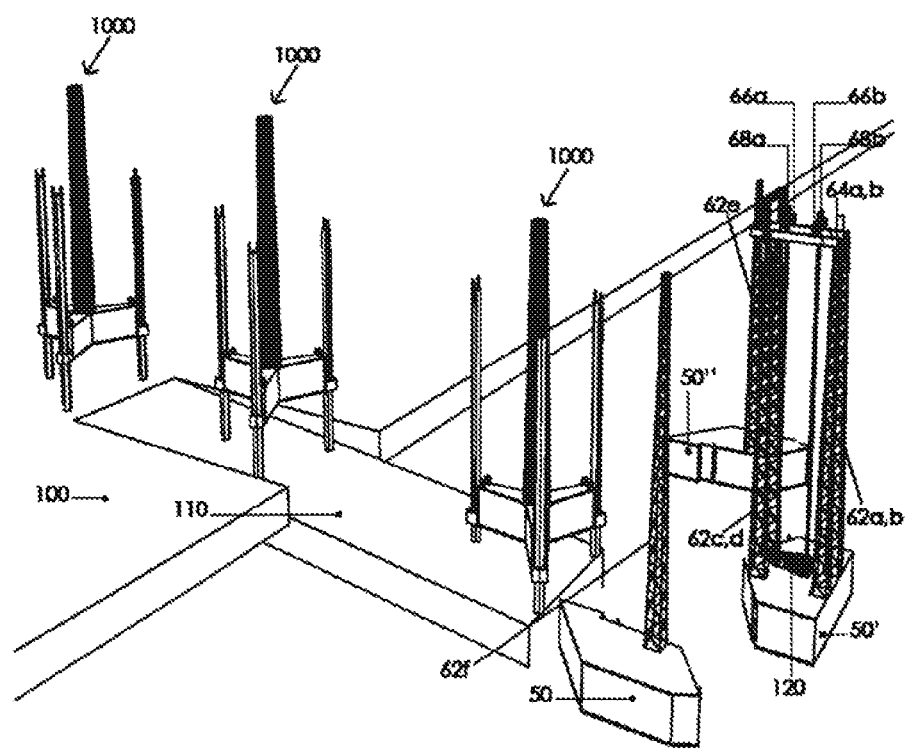
FIG. 6 is a perspective view of equipment to perform said first embodiment of a method of installation in accordance with the present invention, in a stage of launching the base assembly.

After applying said mast 30 in the centre of said platform 40, it reaches the launching stage illustrated in FIG. 6 (at the point represented in this FIG. 6 relative to this embodiment, said anchoring means 10 are now anchored to said piles 20, 20', 20" and said platform 40, but they are not illustrated for reasons of clarity). At the point illustrated in FIG. 6, the buoys 50, 50', 50" have now been launched. In the embodiment illustrated in the present document, each base assembly (overall referenced as 1000) comprising said platform 40, said mast 30, said piles 20, 20', 20" and said anchoring means 10 has been formed in the factory, in this embodiment in a dock 100. Said dock 100 comprises a launching ramp 110 the upper end of which is on a level with said dock 100 and the lower end of which is submerged in the sea. The lower end of said launching ramp 110 is submerged until a depth such that it allows that, instead of the launching ramp 110, the base assembly 1000, with said platform 40 in the intermediate position, rests on the launching ramp 110 by means of its piles 20, 20', 20" and said platform 40 is on a level with said buoys 50, 50', 50", in accordance with the draft of said buoys 50, 50', 50" alone. Said base assembly 1000 is therefore made to lower along the launching ramp 110 until said place of the launching ramp 110, where the stage of securing the base assembly 1000 to said buoys 50, 50', 50" shall be performed. It must be appreciated that, during this process, each pair of winches 22 of each one of said piles 20, 20', 20" shall be independently actuated so that the relative position of each one of said piles 20, 20', 20" with respect to said platform 40 shall vary so that the platform 40 is levelled at all times. In FIG. 6, said base assembly 1000 is situated in said place of the launching ramp 110, and another two base assemblies are shown in previous positions. As can be seen in this FIG. 6, and additionally in FIGS. 8, 10A, 10B and 10C, said buoys 50, 50', 50" have already been provided with lifting means 60, said lifting means 60 comprising six columns 62a, 62b, 62c, 62d, 62e, 62f of metal lattice and two beams 64a, 64b the ends of which rest on upper ends of said columns 62a, 62b, 62c, 62d so that said beams 64a, 64b are parallel. Said beams 64a, 64b are extendible so that they can extend until also resting on upper ends of said columns 62e, 62f. Between said beams 64a, 64b are extended two crossbars 66a, 66b comprising motor means for their displacement throughout said beams 64a, 64b and respective winches 68a, 68b from each one of which hangs a steel rope joined by its free end to a wind turbine 120 previously disposed on one of said buoys 50, 50', 50". The crane assembly formed by said columns 62a, 62b, 62c, 62d, 62e, 62f, said beams 64a, 64b and said crossbars 66a, 66b with their motor means and winches 68a, 68b is an assembly that a person skilled in the art may design in conventional manner in light of the teachings of the present document, for which reason it shall not be described or illustrated in more detail. It is noted, however, that in the present embodiment said columns 62a, 62b, 62c, 62d, 62e, 62f and said inner partition walls of said buoys 50, 50', 50" are disposed so that said columns 62a, 62b, 62c, 62d, 62e, 62f rest on said buoys 50, 50', 50" in vertical correspondence with said inner partition walls of said buoys 50, 50', 50", which avoids or at least reduces the problems of punching of the upper slab 50b, 50b', 50b" of said buoys 50, 50', 50".

For this launching stage, each base assembly 1000 can be displaced along said launching ramp 110, until the place of the launching ramp 110 wherein the stage of securing said base assembly 1000 to said buoys 50, 50', 50" shall be performed.

Figure 7A:
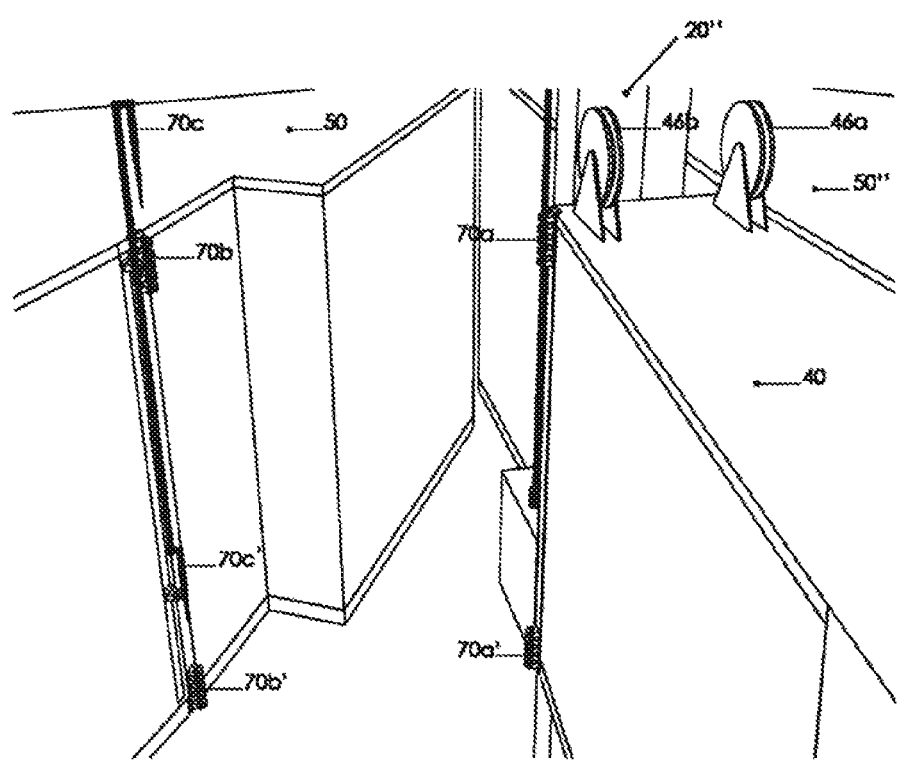
FIG. 7A is a partial perspective view of equipment to perform said first embodiment of a method of installation in accordance with the present invention, in the course of a process of approximating the base assembly to the buoyancy means within the framework of securing said base assembly to said buoyancy means.
Figure 7B:
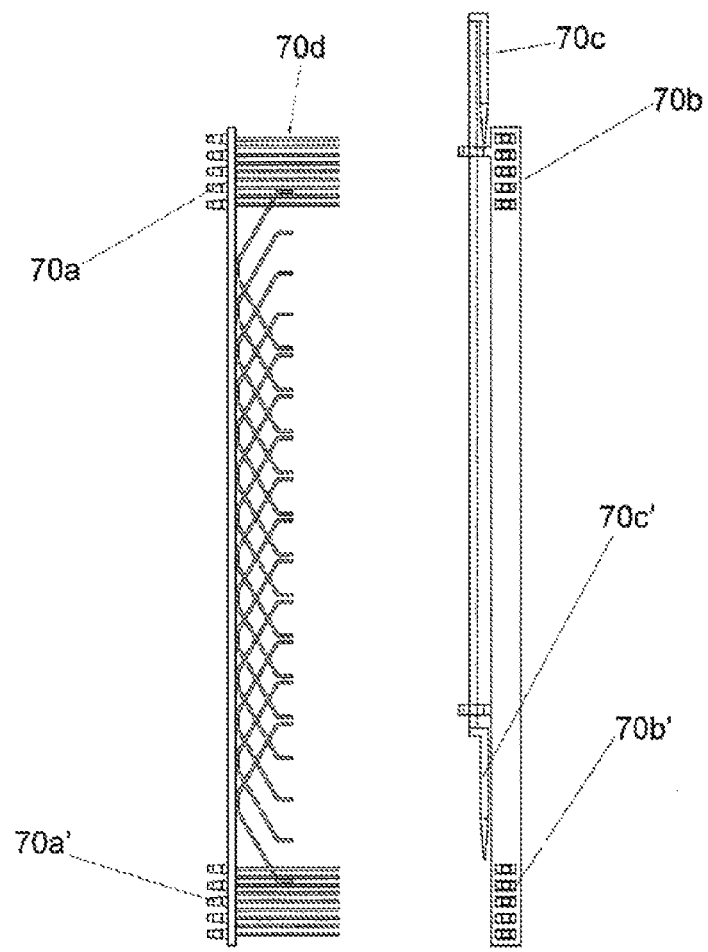
FIG. 7B is an elevational view of the securing devices used in this approximation process isolated from the rest of the equipment.

Passing now to FIG. 7A and with it to the stage of securing said base assembly 1000 to said buoys 50, 50', 50", it shows the approximation of the platform 40 to the buoys 50, 50', 50" (only buoys 50, 50" are visible). For greater clarity, in this figure the water has not been represented, which would cover (and, therefore, conceal) part of both the platform 40 and the buoys, specifically the lowermost area of said structures. Said platform 40 comprises a first securing device 70a, 70a', 70d, and said buoy 50 comprises a second securing device 70b, 70b', 70c, 70c'. Said first securing device comprises a spaced succession 70a of coaxial vertical metal cylinders solidly joined to said platform 40 beside the upper side of said platform 40, and another spaced succession 70a' of coaxial vertical metal cylinders solidly joined to said platform 40 beside the lower side of said platform 40. Said second securing device comprises a spaced succession 70b of coaxial vertical metal cylinders solidly joined to said buoy 50 and a pin 70c beside the upper side of said platform 40, and another spaced succession 70b' of coaxial vertical metal cylinders solidly joined to said buoy 50 and another pin 70c' beside the lower side of said buoy 50. The interaction between said first and second securing means produce the mutual securing thereof. Specifically, the spaced succession 70a, 70a' of coaxial vertical metal cylinders of said platform 40 enter in the spaces created between the spaced succession 70b, 70b' of coaxial vertical metal cylinders of said buoy 50, and vice-versa, until creating different cylinder assemblies. After this, the upper pin 70c and the lower pin 70c' slide through the respective cylinder assembly, thus immobilizing said platform 40 and said buoy 50 between one another. FIG. 7B shows the first securing device in side elevation (left) and the second securing device in front elevation (right) isolated from the rest of the equipment. A steel framework structure 70d of the first securing device can be seen, which is embedded in said platform 40 to achieve the solid joining of said first securing device to said platform. The second securing device may comprise a metal structure similar to the metal structure 7d of the first securing device with the same purpose.

Once all the buoys 50, 50', 50" have been secured to said platform 40 (and optionally to one another), forming a transport assembly (overall referenced as 2000) comprising said base assembly 1000 and said buoys 50, 50', 50", or said transport assembly 2000 is taken to deeper places on the launching ramp 110 until reaching a depth at least equal to the buoyancy draft, of said transport assembly 2000 or each pair of winches 22 of each one of said piles 20, 20', 20" shall be actuated to allow said platform 40 to slide underneath in relation to said piles 20, 20', 20" so that said transport assembly 2000 correspondingly sinks in the water until at least reaching its buoyancy draft. In any of both cases, the load of said transport assembly 2000 passes from said piles 20, 20', 20" to said buoys 50, 50', 50", to be able to recover displacement devices whereon the assembly rests.

Figure 8:
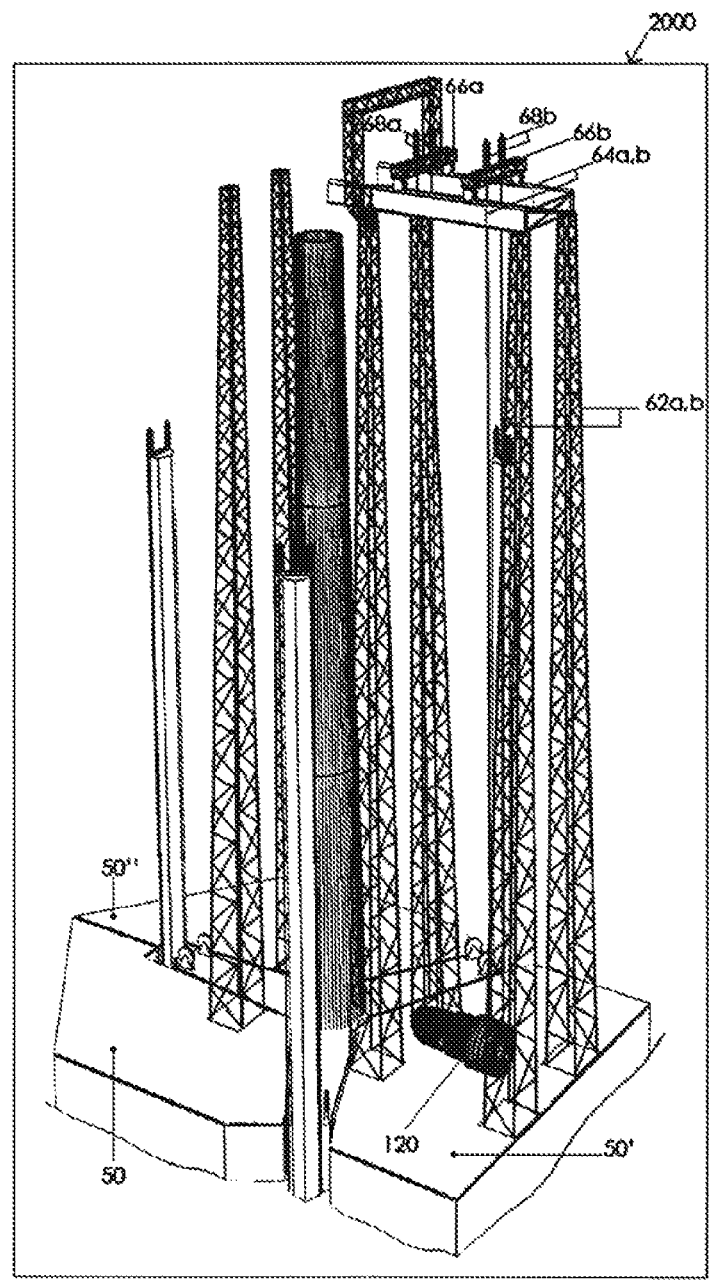
FIG. 8 is a perspective view of equipment to perform said first embodiment of a method of installation in accordance with the present invention, in a stage of transfer of the transport assembly until the location planned for the wind turbine tower.

At this point, it goes on to the transfer stage, represented in FIG. 8. In this stage, said transport assembly 2000 is taken until the location planned for the wind turbine tower. For said purpose, said buoys 50, 50', 50" may be provided with self-propelled means or may be dragged by a tugboat.

Figure 9:
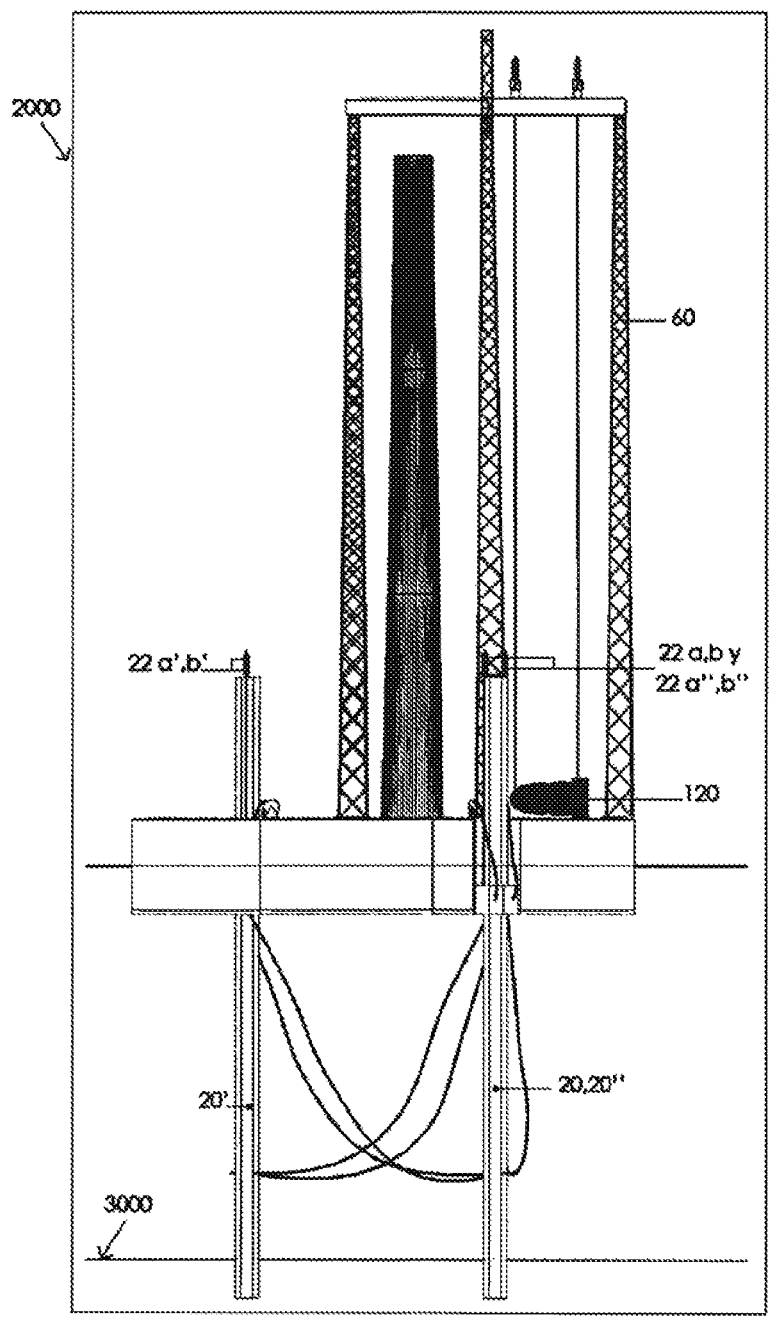
FIG. 9 is a perspective view of equipment to perform said first embodiment of a method of installation in accordance with the present invention, in a sub-stage of pre-driving-in of the piles into the seabed, after a process of lowering said piles.

FIG. 9 shows said transport assembly 2000 now in the planned location for the wind turbine tower, in the stage of securing of said piles 20, 20', 20" in the seabed 3000. To perform this stage, said winches 22 are left idle, so that said piles 20, 20', 20" fall downward until touching the seabed and being pre-driven into it. This drop may be regulated by said means 45, 47; 48, 49 of controlled lowering. After this, said winches 22 again act to draw in the rope, so that the unit assembly 50, 50', 50"; 40; 30 is displaced upwards in relation to said piles 20, 20', 20" and, by the actual weight of the transport assembly 2000 or, if the conditions of the seabed so require, with the aid of external pile driver means (not shown), said piles 20, 20', 20" are finally driven into the seabed. Said pile driver means may also be means of each of said piles 20, 20', 20", in which case said piles 20, 20', 20" would comprise hydraulic pile drive means in a manner known in the state of the art, optionally detachable from said piles 20, 20', 20" to withdraw them after the securing stage and return them to the factory, preferably using said buoys 50, 50', 50", so that they are available for new uses. If immediately after the end of the driving, the unit assembly 50, 50', 50"; 40; 30 is at a height which does not coincide with the floatability level of the transport assembly 2000, it shall generally be higher, then said winches 22 again act, generally to release rope, so that said unit assembly 50, 50', 50"; 40; 30 moves in relation to said piles 20, 20', 20", until the unit assembly 50, 50', 50"; 40; 30 reaches such level of floatability of the transport assembly 2000.

Figures 10A, 10B:
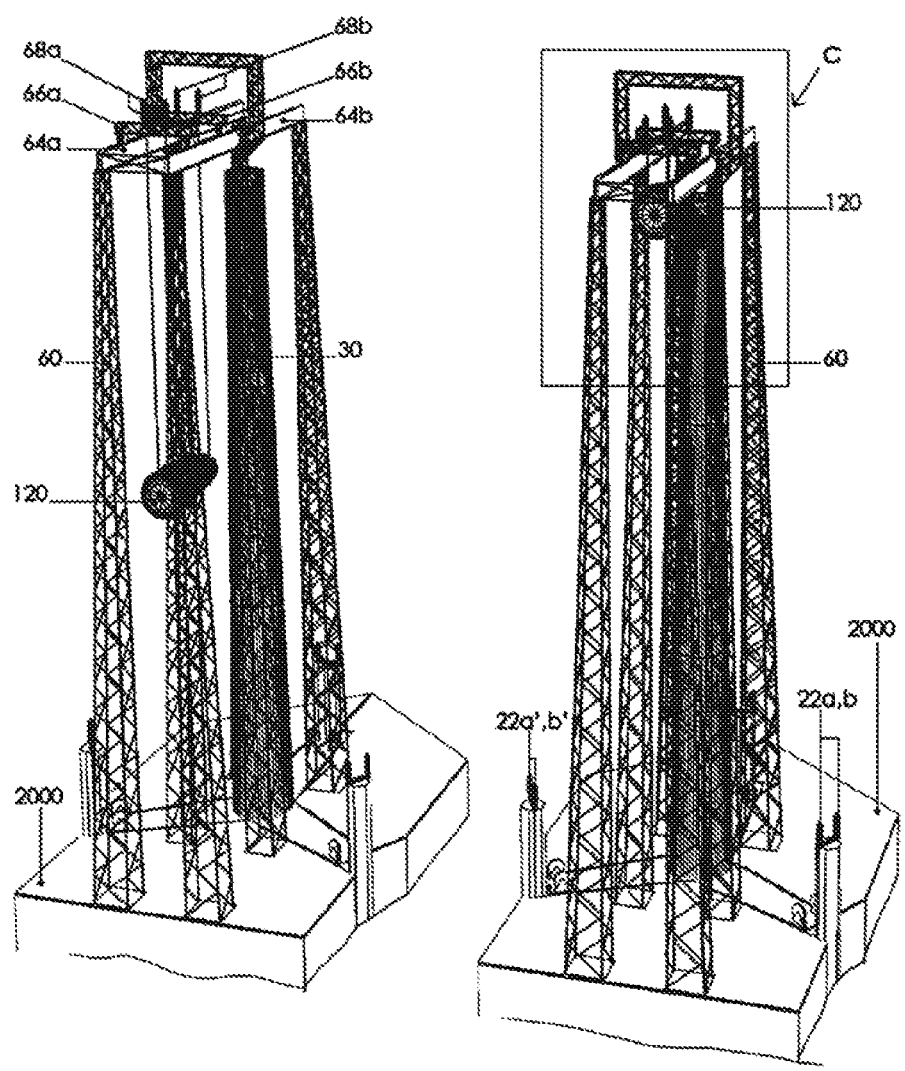
FIGS. 10A and 10B are perspective views of equipment to perform said first embodiment of a method of installation in accordance with the present invention, in a stage of mounting the wind turbine on the mast.
Figure 10C:
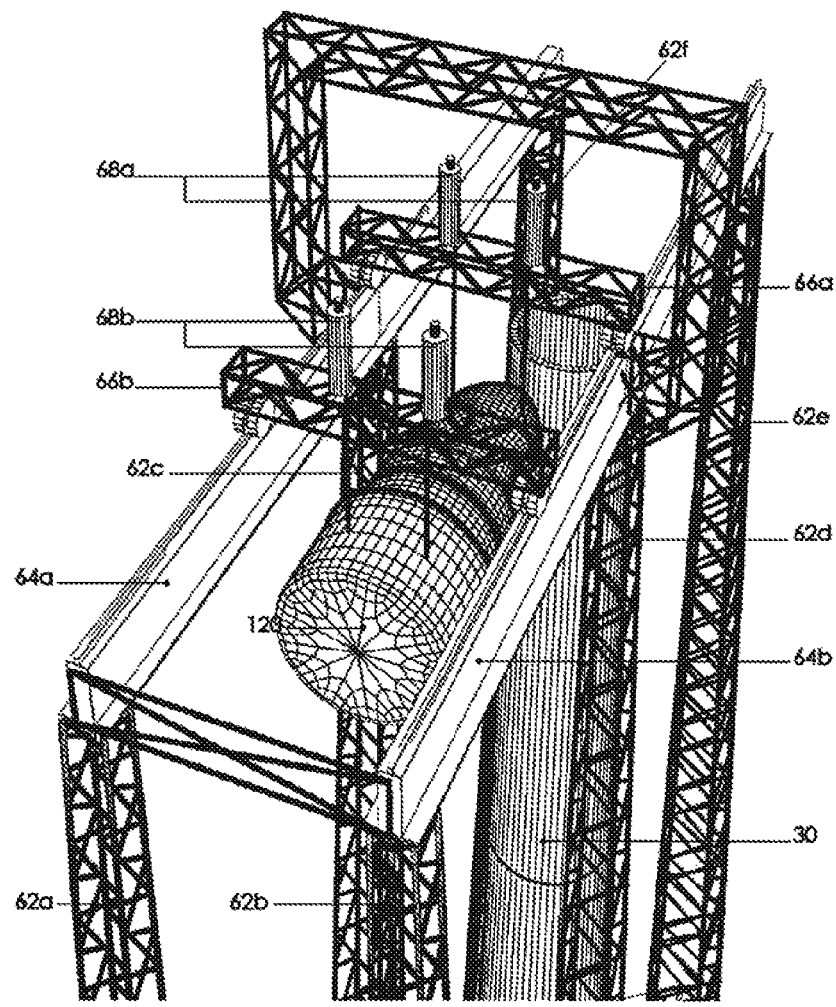
FIG. 10C is a perspective view according to detail C of FIG. 10B, FIGS. 11A and 11B are perspective views of equipment to perform said first embodiment of a method of installation in accordance with the present invention, in a stage of actuation of the actuation means until the platform remains above the height of the surrounding surge, and of tensioning of the anchoring means.

In this first embodiment, the stage of mounting the wind turbine 120 is carried out after the driving-in of the piles, as specifically illustrated in FIGS. 10A, 10B, and 10C. To do this, said winches 68a, 68b of said crossbars 66a, 66b actuate as if to draw in rope and, in consequence, raise said wind turbine 120 throughout a trajectory essentially parallel to the mast 30, until said wind turbine 120 is slightly above its final position in relation to said mast 30. Then, said crossbars 66a, 66b are displaced throughout said beams 64a; 64b to place said wind turbine 120 directly above its use position in relation to said mast 30, and said winches 68a, 68b act again to lower said wind turbine 120 until its use position in relation to said mast 30. If, before the transfer stage of the transport assembly 2000 until the location planned for the wind turbine towers, the wind turbine blades have been applied to said buoys 50; 50', 50", said crane assembly 62a, 62b, 62c, 62d; 64a, 64b; 66a, 66b; 68a, 68b can be used to place said blades.

In accordance with the climatological conditions in existence during the assembly stage of the wind turbine 120, such stage can be carried out in the condition of stable floatability of the assembly, as indicated, or after actuating said winches 22 to raise the unit assembly 50, 50', 50"; 40; 30 above sea level so that the surge does not hit it during this stage. In any case; in this embodiment, after the assembly stage of the wind turbine 120 said winches 22 again act to make the unit assembly 50, 50', 50"; 40; 30 move in relation to said piles 20, 20', 20" until the level of floatability of the buoys 50, 50', 50" to avoid loads on said first securing devices and said second securing devices and thus facilitate the withdrawal of said buoys 50, 50', 50" from said platform 40. It must be indicated that the level of floatability of the buoys 50, 50', 50" is above the level of floatability of the transport assembly 2000.

Figures 11A, 11B:
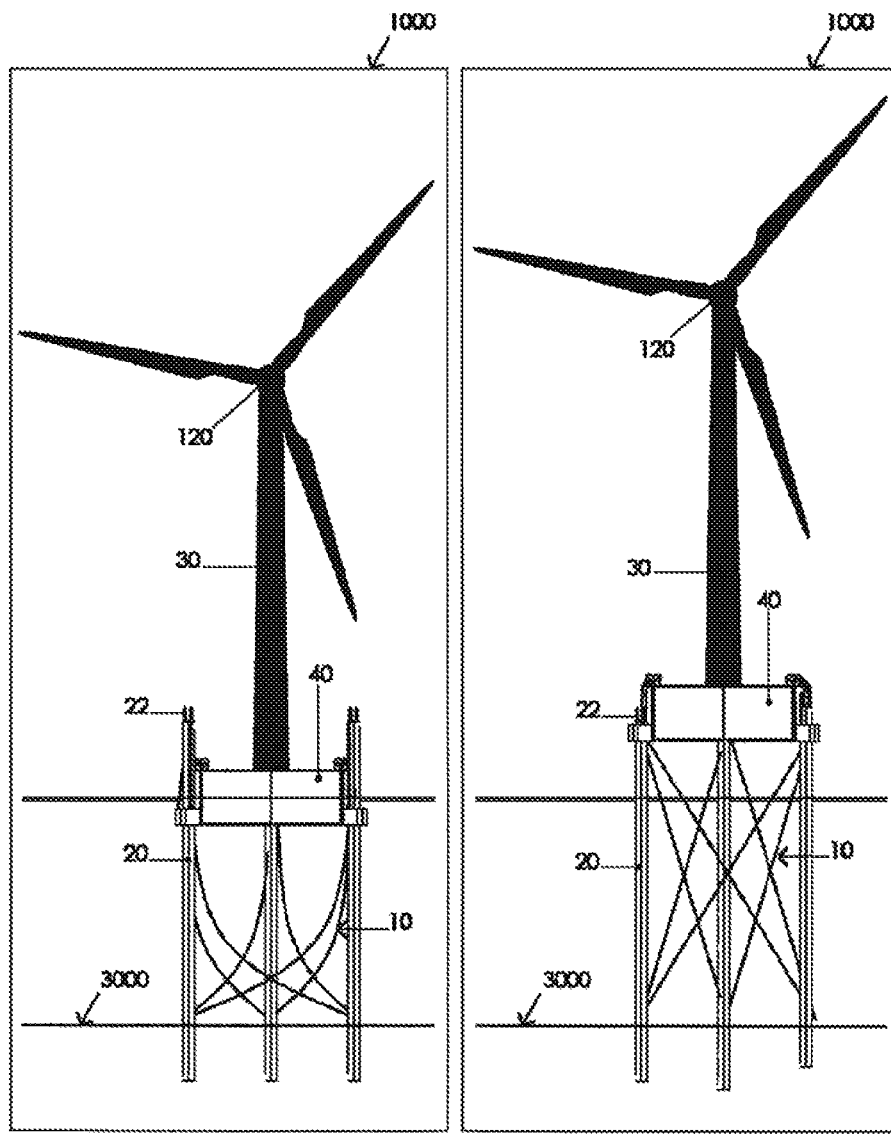

Finally, after detaching said first securing devices and said second securing devices from one another and removing said buoys 50, 50', 50" from said platform 40 so that they are free to be taken to their next destination, said winches 22 again act to make said platform 40 rise with respect to said piles 20, 20', 20", as shown in FIGS. 11A and 11B. Given that said piles 20, 20', 20" are already driven into the seabed and do not go further, said platform 40 is raised until said platform 40 reaches the upper area 26, 26', 26" of said piles 20, 20', 20". After this, said anchoring means 10 are tensioned, preferably using tensioning devices disposed in the upper end of each anchoring means, which exist in the state of the art and are, therefore, not illustrated in the present document. In the embodiment illustrated, said upper area 26, 26', 26" is above the maximum surge level, so that the waves do not hit the platform 40 and, as the section of the piles 20; 20', 20" is relatively small, the forces exerted by the waves on them are not high.

With reference now to FIGS. 12A, 12B, 13A, 13B14A, 14B, a second embodiment is illustrated of a method of installation of an offshore wind turbine tower, with pile-based foundations with footing, in accordance with the present invention.

Figure 12A:
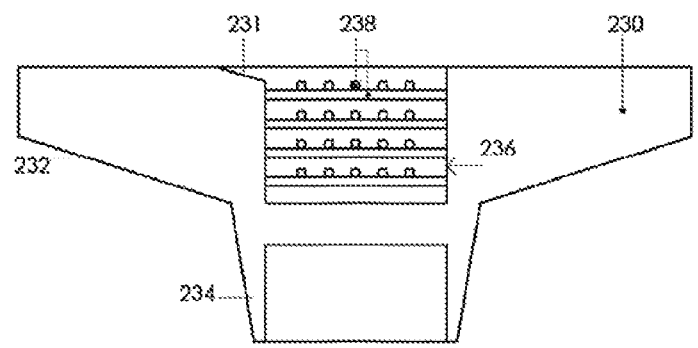
FIGS. 12A and 12B are respectively an elevational view and a top plan view of a footing to perform a second embodiment of a method of installation in accordance with the present invention.
Figure 12B:
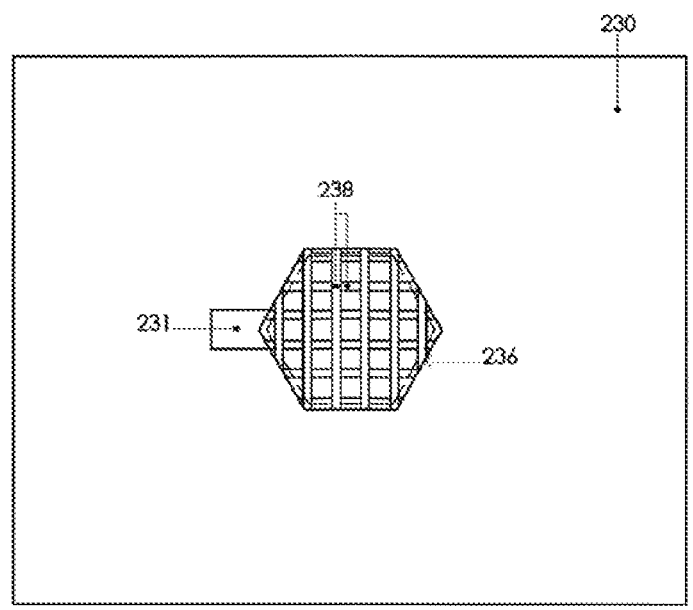

Specifically, FIGS. 12A and 12B are respectively an elevational view and a top plan view of a footing 230 used in this second embodiment of a method of installation in accordance with the present invention.

Figure 13A:
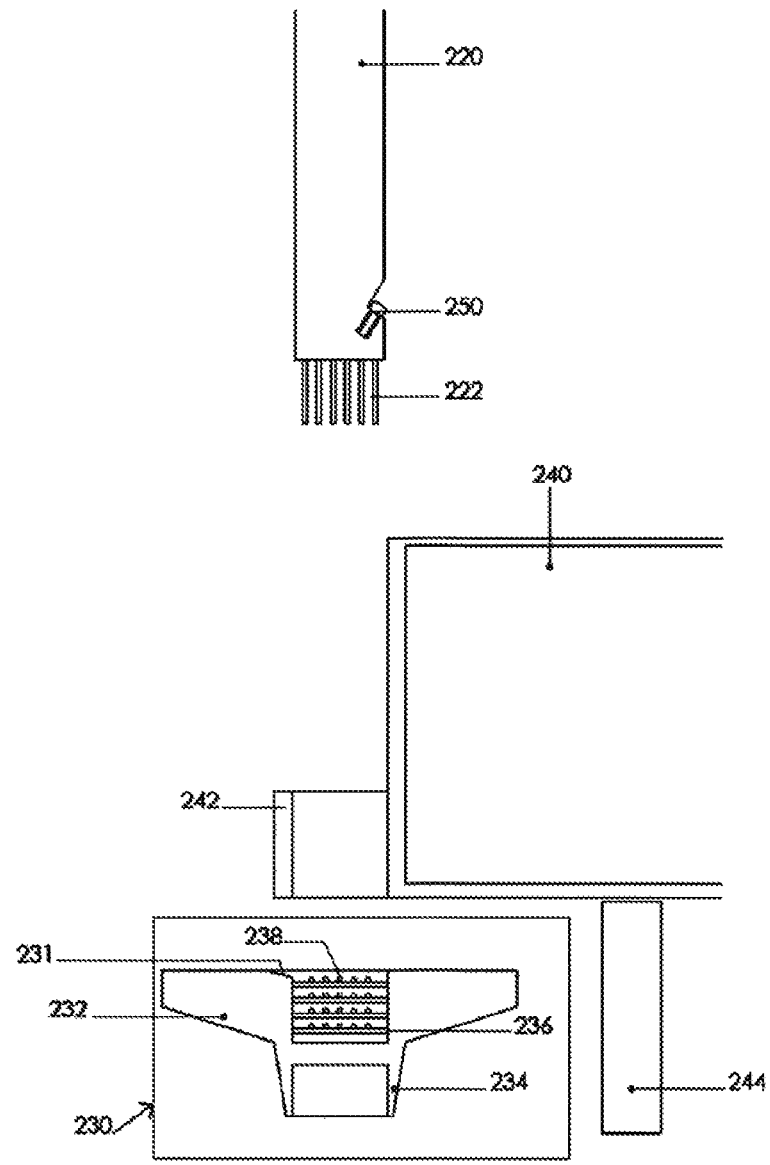
FIGS. 13A and 13B are partial elevational views of equipment to perform said second embodiment of a method of installation in accordance with the present invention, in two moments of a stage of application of the piles to the platforms.
Figure 13B:
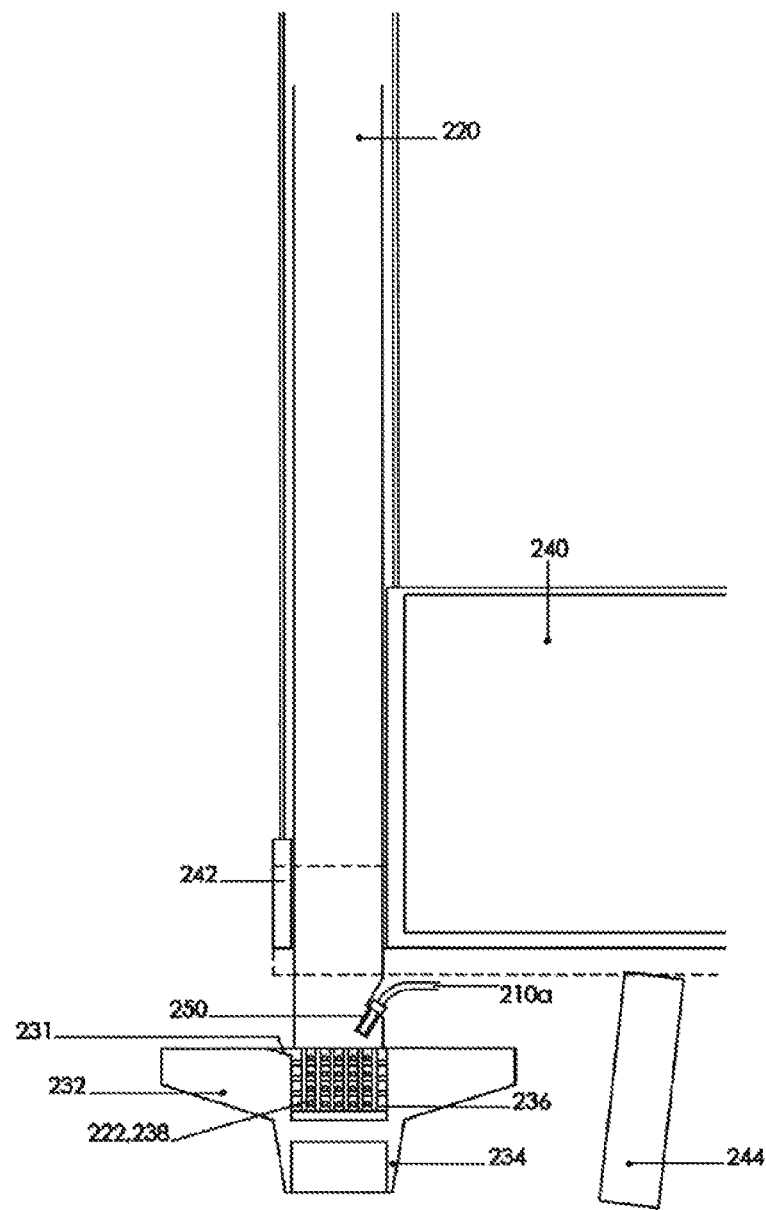

FIGS. 13A and 13B show a stage of said second embodiment of a method of installation of an offshore wind turbine tower, with pile-based foundations with footing, in accordance with the present invention, equivalent to the stage shown in FIG. 2 of said first embodiment of a method of installation of an offshore wind turbine tower, with pile-based foundations, in accordance with the present invention. In particular, FIG. 13A shows a pile body 220 vertically approximating a platform 240, in vertical correspondence with a vertical through-hole of a bracket 242. Said pile body 220 is displaced by means of conventional lifting, for example a crane, not shown. A footing 230 is disposed underneath said platform 240, in vertical correspondence with said vertical through-hole of said bracket 242. Said footing 230 comprises a body 232 of footing and a protuberance 234 in the form of hollow tube which emerges from the lower face of said body 232 of footing and projects downward with a tapered wall profile in downward direction. Furthermore, said body 232 of footing comprises in its upper wall a recess 236 which has a contour coinciding with the contour of said pile body 220 and which houses a framework 238 which can be interlinked with a framework 222 which protrudes from a lower end of said pile body 220. FIG. 13B shows that, once the pile body 220 has been inserted through said vertical through-hole of said bracket 242, said pile body 220 is applied to said footing 230 and said pile framework 222 is interlinked with said footing framework 238. At this point, concrete is poured in said recess 236 through a corresponding trough 231 so that said pile framework 222 and said footing framework 238 are solidly joined and, consequently, said pile body 220 is also solidly joined to said footing 230 to form a complete pile.

In this embodiment, during the stage illustrated in FIGS. 13A and 13B, said platform 240 is supported at a certain level above the ground, using provisional supports 244, to allow disposing said footing 230 below said platform 240. Said level above the ground may be such that said platform 240 is in an intermediate position between the lower area and the upper area of each one of the piles, so that it would not be necessary to additionally displace said platform 240 for anchoring one end of each one of the anchoring means 210*a*, 210*b*, 210*a*', 210*b*', 210*a*", 210*b*" to the lower area of each one of the piles, respectively. In other words, stage b) and stage e) described above would be carried out simultaneously, applying the piles to said platform now in a relative position such that said platform is placed in an intermediate position between the lower area and the upper area of each one of the piles.

As can be seen in FIGS. 13A and 139, said pile body 220 comprises an anchoring coupler 250.

Figures 14A, 14B:
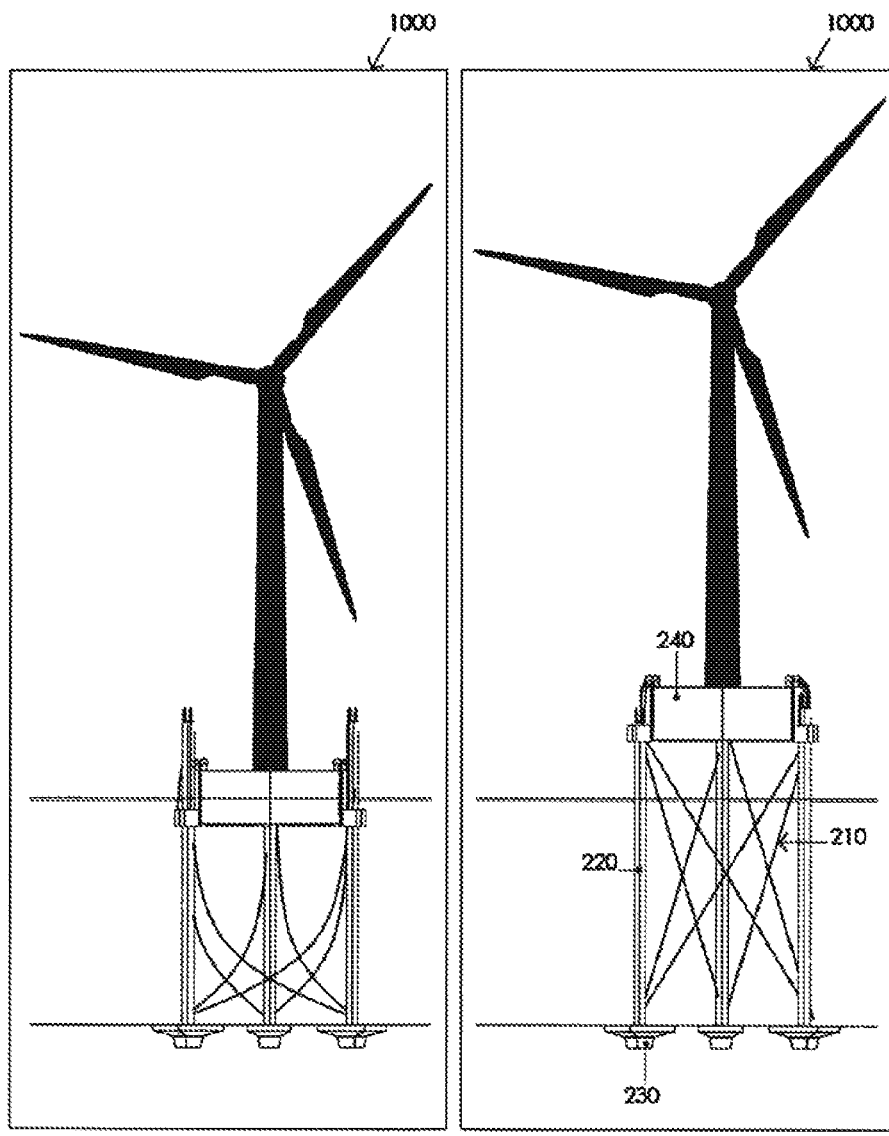
FIGS. 14A and 14B are elevational views of equipment to perform said second embodiment of a method of installation in accordance with the present invention, in a stage of actuation of the actuation means until the platform is on a level with the upper area of each pile, and of tensioning of the anchoring means.

FIGS. 14A and 14B show a stage of said second embodiment of a method of installation of an offshore wind turbine tower, with pile-based foundations with footing, in accordance with the present invention, equivalent to the stage shown in FIGS. 11A and 11B of said first embodiment of a method of installation of an offshore wind turbine tower, with pile-based foundations, in accordance with the present invention. Given that the piles 220, 220', 220", in particular their respective footings 230, 230', 230", are already embedded in the seabed and do not go any deeper, said platform 240 is raised until said platform 240 remains at a level with the upper area of each one of the piles 220, 220', in use position. After this, said anchoring means 210*a*, 210*b*, 210*a*', 210*b*', 210*a*", 210*b*" are tensioned, preferably using tensioning devices disposed in the upper end of each anchoring means, which exist in the state of the art and are therefore not illustrated in the present document.

The method and the equipment to perform said second embodiment of a method of installation of an offshore wind turbine tower, with pile-based foundations with footing, in accordance with the present invention, are similar to the method and to the equipment to perform said first embodiment of a method of installation of an offshore wind turbine tower, with pile-based foundations, in accordance with the present invention, with the adaptations evident for a person skilled in the art in light of the teachings disclosed in the present document.

Figure 15:
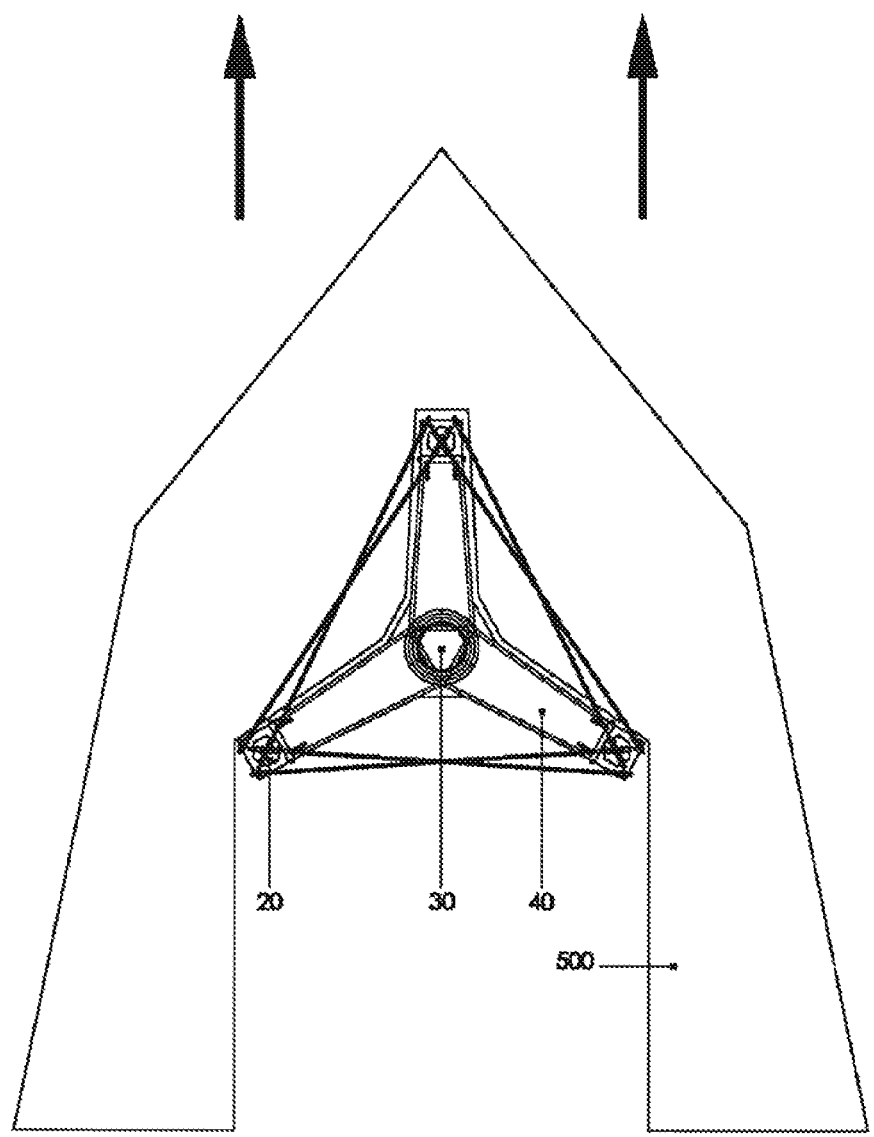
FIG. 15 is a top plan view of alternative buoyancy means for their use with said first and second embodiments of a method of installation in accordance with the present invention.

Passing to FIG. 15, it shows a plan view of alternative buoyancy means, which may be used both with the first embodiment of a method of installation of an offshore wind turbine tower, with pile-based foundations, in accordance with the present invention, illustrated in FIGS. 2-11, and with the second embodiment of a method of installation of an offshore wind turbine tower, with pile-based foundations with footing, in accordance with the present invention, illustrated in FIGS. 12-14. These buoyancy means comprises a single buoy 500 instead of comprising three buoys 50, 50', 50" such as the buoyancy means described above. Furthermore, these alternative buoyancy means are similar to those described above. For example, said buoy 500 will have securing means applicable to complementary securing means of said platform 40 as the person skilled in the art will determine in light of the teachings of the present document. The planned direction of the resulting transport assembly 500; 40; 30; 20, 20', 20"; 10 is represented in FIG. 15 using two parallel arrows.

Finally, FIGS. 16A and 16B are views which illustrate anchoring configurations of anchoring means in a pile which can be used in a method of installation of an offshore wind turbine tower, with pile-based foundations, in accordance with the present invention. In particular, FIG. 16A shows an anchoring coupler 300 embedded in a pile 350, wherein the end of an anchoring means 360 shall be applied. The coupler 300 is embedded in one 310 of a plurality of holes 310, 320 disposed at different heights in said pile 350. Providing a plurality of holes 310, 320 disposed at different heights in said pile 350 enables anchoring the anchoring means 360 more above or below depending on the planned level of the seabed in the installed condition of the tower, so that piles may be manufactured which, with a single design, can be used with different planned level values of the seabed in the installed condition of the tower. In particular, FIG. 16B shows an anchoring device comprising a ring 400 which surrounds the pile 450, whereto is joined the end of an anchoring means 460 using an anchoring coupler 470. In a position diametrically opposite said anchoring coupler, said ring 400 includes a pin 410 which is projected from said ring 400 in a radially internal direction in relation to said ring 400, until being inserted in a corresponding hole 420 of a plurality of holes 420, 430, 440 disposed at different heights in the pile 450. Providing a plurality of holes 420, 430, 440 disposed at different heights allows anchoring the anchoring means 460 more above or more below depending on the planned level of the seabed in the installed condition of the tower, so that piles may be manufactured which, with a single design, can be used with different planned level values of the seabed in the installed condition of the tower.

After completing the method described, one or more of the following actions may be carried out, to further optimize said method.

Said buoys 50, 50', 50"; 500 may be returned to the dock 100 for their use in a new method in accordance with the present invention, with a new tower. Said platform 40 may be filled with ballast, for example if it is understood to be necessary in view of the type of terrain wherein the tower has been installed. The ballast may be water, optionally water from the same water mass wherein the tower is installed, driven by means of conventional pumps, for example. A fine levelling of the platform 40 on the piles 20, 20', 20"; 220, 220', 220" can be performed. Likewise, the joint between said piles 20, 20', 20"; 220, 220', 220" and said platform 40 can be fulfilled with a hardenable material such as epoxy mortar. Finally, elements may be removed that may have been used in the method, which are not necessary for the operation of the tower in installed condition and which may be reused in new procedures, such as the winches 22.

Of course, once in installed condition, the tower is completed with the connection of the power lines and their commissioning, in conventional manner.

Alternatively, in the embodiment illustrated in the present document, the wind turbine and its corresponding blades may be mounted on the mast 30 in the factory, after the launching of the base assembly 1000 and the application of the buoys 50, 50', 50" to said base assembly 1000, so that the resulting transport assembly 2000 would have said wind turbine and said blades already mounted in operating position, thus avoiding the need for assembly operation of wind turbine means in the mast 30 on reaching the definitive site of the tower, normally a wind farm.

Using this last alternative, it also avoids using lifting means 60, although the buoys 50, 50', 50" must be dimensioned so that it guarantees the stability of the assembly 2000 with the wind turbine means already mounted during the navigation, bearing in mind that the centre of gravity becomes at a higher level on mounting wind turbine means in the upper end of the mast 30.

Naturally, maintaining the principle of the invention, the embodiments and the construction details may widely vary in relation to those described and illustrated purely by way of non-limiting example, without for this reason departing from the scope of the invention as defined in the attached claims.

By way of non-limiting example, the embodiments described above include actuation and/or braking means based on winches, which logically may be different in number from those described here and illustrated by way of example in relation to the embodiments discussed, but said actuation and/or braking means may be based on another type of device, for example racks, hydraulic jacks, etc., as can be determined by a person skilled in the art in light of the teachings of the present document.

The platform may have forms different to the three-point star described and illustrated in relation to the particular embodiments treated in the present document. It may be polygonal, with any number of sides, in the form of a star with a number of points different to three, etc., also varying the number of piles. Likewise, although in the specific embodiments described and illustrated, the piles, the mast, the platform and the buoys are made of concrete, using prefabricated concrete sheets and joined together by a manner known in the state of the art, all or part of them could in fact be made from another material, e.g. metal, composite, etc., or from a combination of materials, for example concrete-metal, metal-composite, concrete-metal-composite, etc. and they may have forms different to those disclosed in the description and illustrated in the figures.

Furthermore, the size and form of the footing will depend on the type of terrain anticipated on the seabed. The plan perimeter of the footing may be rectangular, as represented in FIG. 12B, or of any other form (polygonal, circular, etc.). If the characteristics of the terrain make it advisable, the pile-footing joint may be articulated, instead of embedded as represented in the present document.

The invention claimed is:

1. Method of installation of an offshore wind turbine tower, with pile based foundations:
   a) said wind turbine tower comprising:
      a tower mast,
         at least three piles,
         anchoring means,
         a platform with first securing means, and
         buoyancy means with second securing means,
         wherein each of the piles includes an upper area designed to be on a level with the platform in an installed condition and a lower area designed to receive said anchoring means below said upper area and above a planned level of the seabed in the installed condition,
         wherein the interaction between said first securing means of said platform and said second securing means of said buoyancy means produce a mutual securing thereof;
   b) ashore, applying said piles to said platform so that said piles are essentially vertical and each one of the piles are axially displaced with respect to said platform;
   c) ashore, applying the tower mast to said platform in a relative position of use in the installed condition of the offshore wind turbine tower;
   d) ashore, a disposing actuation and/or braking means operationally between each one of the piles and the platform, so that the actuation of the actuation and/or braking means control the axial displacement of each pile with respect to said-the platform;
   e) ashore, disposing the platform and the piles in a relative position such that the platform is placed in an intermediate position between the lower area and the upper area of each one of the piles, using the actuation of said actuation and/or braking means;
   f) anchoring one end of each one of the anchoring means to the lower area of each of the piles, respectively, and anchoring the other end of each one of the anchoring means to said platform, so that each one of the anchoring means does not substantially support any tensile stress and, in the installed condition of the offshore wind turbine tower, each one of the anchoring means forms an angle with the vertical;
   g) launching the buoyancy means;
   h) launching a base assembly, wherein the base assembly comprises the platform, the tower mast, the piles and the anchoring means;
   i) securing said base assembly to said buoyancy means using the application to one another of said first and second securing means to form a transport assembly, and providing said buoyancy means with sufficient floatability to keep afloat the transport assembly;

j) transferring said transport assembly to the location planned for the wind turbine tower;

k) actuating said actuation and/or braking means so that said piles displace downwards with respect to said platform, until an end of each one of the piles touches the seabed;

l) fastening the lower end of each one of said piles to the seabed;

m) actuating said actuation and/or braking means until said platform is on a level with said upper area of each one of the piles;

n) mounting a wind turbine means on the tower mast;

o) detaching said first and second securing means from one another and removing said buoyancy means from said platform; and p) tensioning said anchoring means.

2. Method of installation according to claim 1, wherein said anchoring means is flexible.

3. Method of installation according to claim 2, wherein said anchoring means is steel or carbon fiber tendons.

4. Method of installation according to claim 1, wherein said upper area is designed to remain above the maximum surge level applicable in the installed condition of the offshore wind turbine tower.

5. Method of installation according to claim 1, wherein, in stage o), the buoyancy means and the platform are at a depth equal to the buoyancy draft of the buoyancy means alone.

6. Method of installation according to claim 1, wherein the buoyancy means is reusable.

7. Method of installation according to claim 1, wherein the platform comprises at least three through-holes; wherein a respective pile is disposed in a respective through-hole and can slide axially within its respective through-hole.

8. Method of installation according to claim 7, wherein said through-holes are disposed in locations equidistant to one another and in relation to the centre of said platform, and wherein the tower mast is disposed in the centre of said platform.

9. Method of installation according to claim 7, wherein the anchoring means is anchored so that from each lower area of a pile emerge two anchoring means, each one of them towards a bobbin close to each one of the other two piles, so that, in the installed condition of the offshore wind turbine tower, when said anchoring means is tensioned, there are anchoring means forming a St. Andrew Cross on each imaginary surface delimited by two piles.

10. Method of installation according to claim 1, wherein stage b) and stage e) are performed simultaneously, applying the piles to the platform in a relative position such that the platform is placed in an intermediate position between the lower area and the upper area of each one of the piles.

11. Method of installation according to claim 10, wherein the platform rests on a provisional pedestal or is suspended at a certain height at the time of applying the piles to the platform.

12. Method of installation according to claim 1, wherein, before stage j), the wind turbine means is disposed on said buoyancy means.

13. Method of installation according to claim 12, wherein said buoyancy means include lifting devices capable of lifting until its use position the wind turbine means from its position on said buoyancy means.

14. Method of installation according to claim 1, wherein stage n) is carried out before stage j).

15. Method of installation according to claim 14, wherein stage n) is carried out in a factory.

16. Method of installation according to claim 15, wherein stage n) is carried out using the method steps performed in stages b)-c).

17. Method of installation according to claim 1, wherein the piles are designed to be driven into the seabed to produce the pile-based foundation of said wind turbine tower.

18. Method of installation according to claim 17, wherein stage 1) comprises two sub-stages:
1.1) pre-driving the piles into the seabed, simply due to their own weight;
1.2) driving the piles into the seabed, by the application of additional weight or by the use of pile driver means.

19. Method of installation according to claim 18, wherein stage 1), or sub-stages 1.1) and/or 1.2), are carried out using external pile driver means.

20. Method of installation according to claim 18, wherein stage 1), or sub-stages 1.1 I) and/or 1.2), are carried out by actuating said actuation and/or braking means of each one of the piles so that the platform is displaced upwards with respect to the piles and the weight of the platform, and also consequently the weight of all the components applied to said platform causes the driving-in of the piles.

21. Method of installation according to claim 1, wherein the piles have a footing, and wherein the footing is positioned in the seabed to a planned measurement.

22. Method of installation according to claim 21, wherein the footing comprises a substantially horizontal body of footing and at least one protuberance which emerges from the lower face of said body of footing and which has a tapered profile in downward direction.

23. Method of installation according to claim 21, wherein said stage 1) is carried out by actuating the actuation and/or braking means of each one of the piles so that the platform is displaced upwards with respect to the piles and the weight of the platform, and also consequently the weight of all the components applied to the platform causes the embedding of the footings.

24. Method of installation according to claim 1, wherein the buoyancy means is formed by a single buoyancy unit.

25. Method of installation according to claim 1, wherein the buoyancy means comprises at least two of buoyancy units.

26. Method of installation according to claim 25, wherein said at least two buoyancy units of the buoyancy means comprise a third securing means such that the interaction between the third securing means of the respective buoyancy units produce the mutual securing thereof.

27. Method of installation according to claim 1, wherein the buoyancy means is motorized, so that the transport assembly is a self-propelled transport assembly.

28. Method of installation according to claim 1, wherein the tower mast provided in stage a) is formed by stretches of mast.

29. Method of installation according to claim 28, wherein at least one of the stretches of mast is formed by segments.

30. Method of installation according to claim 29, wherein the application of the tower mast to the platform in the relative position of use in the installed condition of offshore wind turbine tower, according to stage c), is carried out by
a) using a segment-to-segment placement process or,
b) by using a stretch-to-stretch placement process after the stretches have been premounted, or
c) using a placement process which is a combination of the two aforementioned processes.

31. Method of installation according to claim 28, wherein the tower mast is telescopic self-expanding.

32. Method of installation according to claim 31, wherein the tower mast is in retracted condition during stage j).

33. A system for an offshore wind turbine tower, said wind turbine tower comprising a tower mast, at least three piles, anchoring means, a platform designed to support the tower mast and to rest on the at least three piles, and buoyancy means, the at least three piles being applied to the platform so that the at least three piles are essentially vertical and each one of the at least three piles can be axially displaced with respect to said platform, each one of the at least three piles including an upper area designed to be on a level with the platform in the installed condition of the offshore wind turbine tower, and a lower area situated below said upper area and above the planned level of the seabed in the installed condition of the offshore wind turbine tower designed to receive at least two of the anchoring means, wherein a wind turbine means is mounted on the tower mast.

34. A system according to claim 33, wherein the anchoring means is flexible.

35. A system according to claim 34, wherein the anchoring means is steel or carbon fibre tendons.

36. A system according to claim 33, wherein the upper area is designed to remain above a maximum surge level applicable in the installed condition of the offshore wind turbine tower.

37. A system according to claim 33, wherein the buoyancy means is reusable.

* * * * *